United States Patent
Mosher, Jr. et al.

(10) Patent No.: US 6,785,696 B2
(45) Date of Patent: Aug. 31, 2004

(54) SYSTEM AND METHOD FOR REPLICATION OF DISTRIBUTED DATABASES THAT SPAN MULTIPLE PRIMARY NODES

(75) Inventors: Malcolm Mosher, Jr., Los Gatos, CA (US); Charles S. Johnson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 09/872,323
(22) Filed: Jun. 1, 2001

(65) Prior Publication Data

US 2002/0184239 A1 Dec. 5, 2002

(51) Int. Cl.[7] .............................................. G06F 17/30
(52) U.S. Cl. ........................ 707/204; 707/200; 707/202
(58) Field of Search ................................ 707/201, 202, 707/204, 200

(56) References Cited

U.S. PATENT DOCUMENTS

| | | | |
|---|---|---|---|
| 5,740,433 A | 4/1998 | Carr et al. .................... 395/618 |
| 5,745,753 A | 4/1998 | Mosher, Jr. .................. 395/618 |
| 5,781,910 A * | 7/1998 | Gostanian et al. ........... 707/201 |
| 5,794,252 A | 8/1998 | Bailey et al. ................ 707/202 |
| 5,799,322 A | 8/1998 | Mosher, Jr. .................. 707/202 |
| 5,799,323 A * | 8/1998 | Mosher et al. .............. 707/202 |
| 5,832,203 A | 11/1998 | Putzolu et al. ......... 395/182.18 |
| 5,835,915 A | 11/1998 | Carr et al. ................... 707/202 |
| 5,884,328 A | 3/1999 | Mosher, Jr. .................. 707/202 |
| 5,926,816 A * | 7/1999 | Bauer et al. .................... 707/8 |
| 5,956,489 A * | 9/1999 | San Andres et al. ......... 709/221 |
| 6,496,949 B1 * | 12/2002 | Kanevsky et al. ............ 714/47 |

* cited by examiner

*Primary Examiner*—Wayne Amsbury
*Assistant Examiner*—Cam-Linh Nguyen

(57) ABSTRACT

A method and system for backing up primary nodes onto backup nodes where the primary nodes can each originate a distributed transaction and can participate in a distributed transaction. The backup nodes, after a primary node failure, undo all transactions whose state is unknown on the backup node and all committed transactions which, if kept, would lead to an inconsistent set of backup nodes. First, committed transactions are undone if commits for them were not received on all back up nodes to the primary nodes that participated in the transaction. Second, all committed transactions that potentially depend on the committed transactions that were undone are also undone. Only those transactions that are provably independent of the committed transactions that were undone are kept. The result is a set of back up nodes which can support operations until the failing primary node is restored.

17 Claims, 33 Drawing Sheets

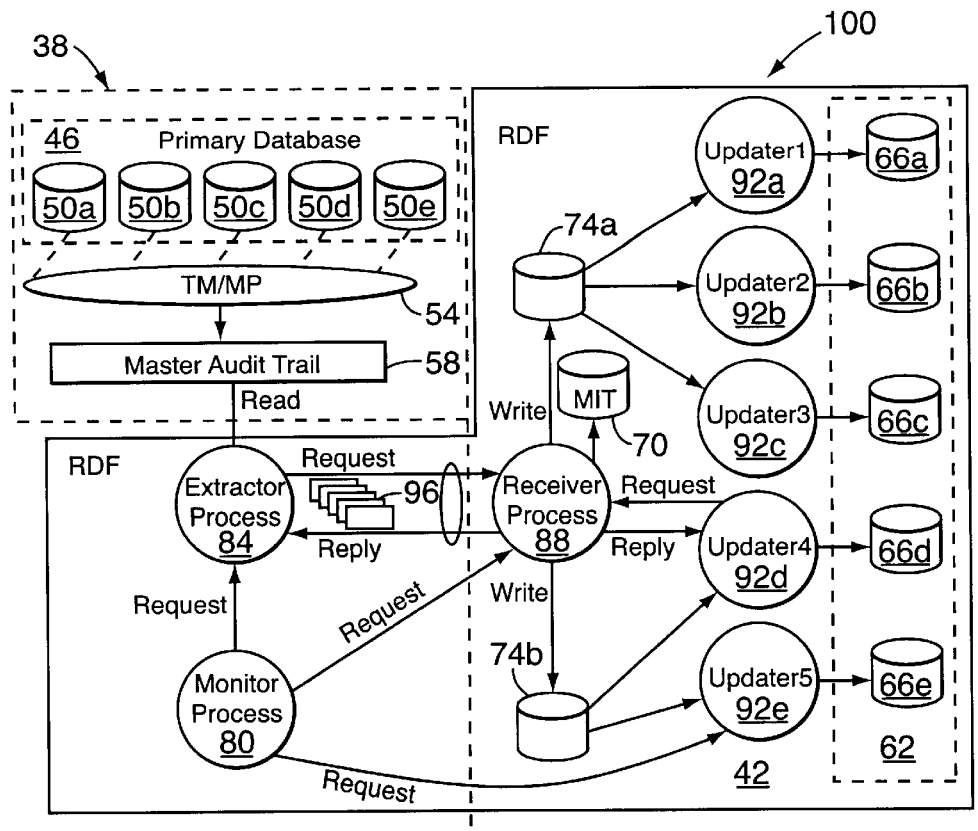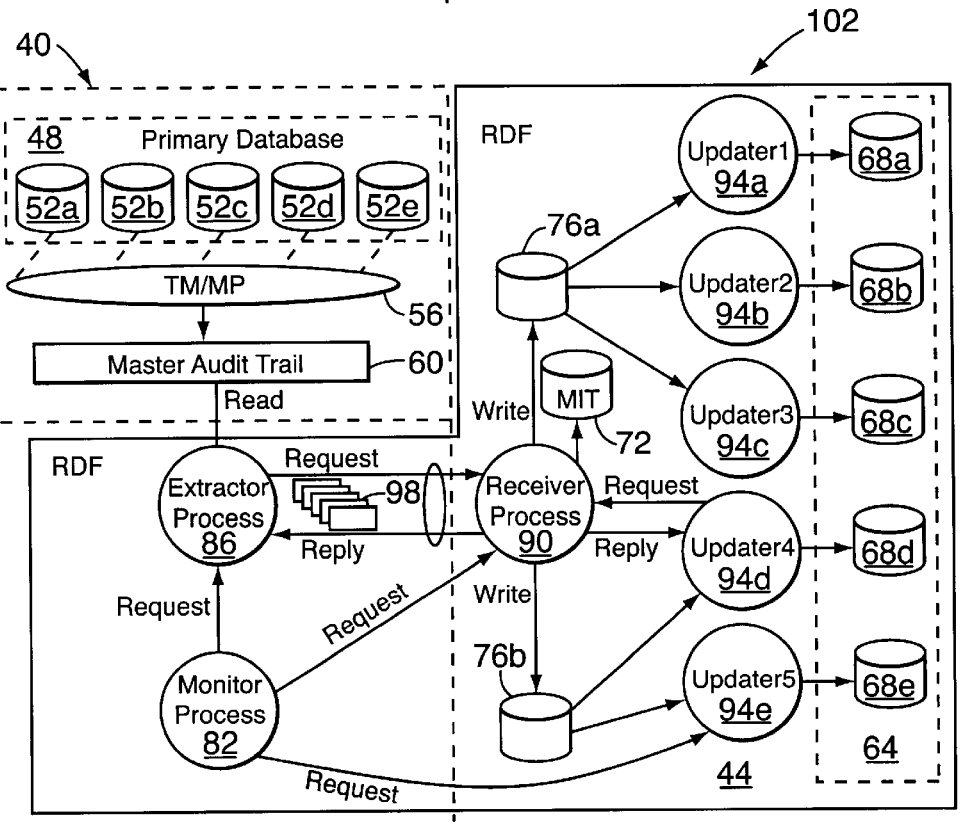
FIG. 2

- Global Config Record  122
  - Primary System Node Name — 140
  - Backup System Node Name — 142
  - RDF Control Subvolume Suffix — 144
  - RDF Initialization Time, etc. — 146
  - Log File Specifications — 148
  - Number of Image Trails — 150
  - Number of Protected Volumes — 152
  - Number of Message Buffers — 154
  - Net Master Info — 156
- {Network Record (for each node)
  - Primary Node Name — 160
  - Backup Node Name — 162
  - Control Subvolume — 164
  - Sync File Volume — 166
  - tx_id_prev (sync point)} — 167 / 124
- Monitor Config Record  126
- Extractor Config Record  128
- Receiver Config Record  130
  - CPU Assignments, Process Priority, etc.
  - Process Name
  - Size of Image Files
  - Location of MIT Volume  } 158
  - ...
- Purger Config Record  132
  - Image Trail File Retain-Count — 168
- Updater Config Record  134
  - Image Trail ID — 170
  - Primary Volume ID — 172
  - Backup Volume ID — 174
  - ...
- Image Trail Config Record  136
  - Image Trail Volume ID — 176
  - ...

120 (outer)

FIG. 3

MAT
- TMP Control Record 1 —182a
  - Data Record 1 —184a
    - Update —210
      - Synchronization Info —214
        - counter, tx_id_current, tx_id_prev —218, 220
        - 216
        - name of synchronization file —222
      - Backout (Undo) —212
  - Data Record 2 —184b
  - ...
  - Data Record N —184c
  - Transaction State 1 —186a
    - tx_id —196
    - Committed —200
    - Aborted —202
    - Alive —198
      - aborting —204
      - prepared —206
      - active —208
  - Transaction State 2 —186b
  - ...
  - Transaction State N —186c
  - Stop Updaters —188
  - ...
- TMP Control Record 2 —182b
  - Data Record 1 —190a
  - Data Record 2 —190b
  - ...
  - Data Record N —190c
  - Transaction State 1 —192a
  - Transaction State 2 —192b
  - ...
  - Transaction State N —192c
  - Stop Updaters —194
  - ...
- TMP Control Record N —182c
- EOF

MIT
- Header     302 — 300
  - Blk Psn — 310
  - Ptr to 1st Image Record to start in block — 314
  - Ptr to end of last complete Rec in block — 316
  - Ptr to next available byte in block, if any — 318
  - MAT Psn of 1st Image Rec in block — 320
- TMP Control Record 1 — 304a
  - Transaction State 1 — 306a
    - Committed — 322
    - Aborted — 324
    - Alive
      - aborting — 326
      - prepared — 328
      - active — 330
  - Transaction State 2 — 306b
  - Transaction State N — 306c
  - ...
- TMP Control Record 2 — 304b
  - Transaction State 1 — 308a
  - Transaction State 2 — 308b
  - Transaction State N — 308c
  - 
  - ...
- TMP Control Record N — 304c
  - ...

FIG. 7

SIT

Local_Commit
Master_Commit

Local_Undo
Network_Undo

Updater Context Record

Receiver Context Record

SYSTEM AND METHOD FOR REPLICATION OF DISTRIBUTED DATABASES THAT SPAN MULTIPLE PRIMARY NODES

CROSS-REFERENCE TO RELATED APPLICATIONS

1. Field of the Invention

The present invention relates generally to providing a backup database system to a primary database system and more particularly to providing a backup database system to a distributed primary database system.

2. Description of the Related Art

A transaction database management system (DBMS) must ensure that every transaction performed by the system has four important properties. Each transaction, which consists of a series of reads and writes of database objects, must be (i) atomic, (ii) consistent regarding the database objects it affects, (iii) isolated from other transactions with which it may be concurrent, and (iv) persistent after it is completed (durable). (These are the so-called ACID properties of a DBMS.) An atomic transaction is one that is either carried out completely or not done at all. A durable transaction is one that, once completed, is from then one always completed despite system failures that may occur subsequent to its completion.

A part of the transaction DBMS, called the recovery manager, is responsible for ensuring that each transaction is atomic and durable. In order for the recovery manager to ensure these transaction properties, it is customary for the recovery manager to maintain a log file (or audit file) of all changes to the database objects. This log file is stored on a storage medium that survives system failures and media failures. Changes to the database objects are made only after the change which is to occur is written to the log file (known as write-ahead logging). The log file allows the recovery manager to perform undo operations and redo operations. Undo operations remove actions made upon the database objects for transactions that did not complete. Redo operations repeat all the actions of a transaction that did complete. Redo operations must proceed from a known or determined point in the log file. By these operations, the database is restored to the state it had prior to the failure it experienced.

If a primary transaction database system having the ACID properties is centralized (meaning that a single transaction monitor is used), it is possible to provide a backup database system that can provide complete functionality when the primary database system fails. The backup database system must be transactionally consistent with the primary system so that the transfer of operations onto the backup system is seamless. Transactional consistency means that all transactions that have been committed on the primary system are committed on the backup system and all transactions that have been or were in the process of being aborted on the primary are aborted on the backup system. One such primary and backup system is disclosed in U.S. Pat. No. 5,799,323, which is incorporated by reference into this document.

However, if a primary database system is only part of a larger database system such that there are multiple primary database systems (primary nodes each having a transaction monitor) and multiple backup systems (backup nodes, one for each primary node), then the current art backup system recovery procedures cannot guarantee that the multiple backup nodes are in a consistent state when a failure of a primary node occurs, if a transaction is distributed across and affects two or more of the multiple primary nodes. The reason is that an unplanned outage of a primary node can cause transactions received on the backup node for the primary node to be in an incomplete state (neither committed nor aborted) (lack of local consistency) and committed distributed transactions not to be received as committed on each and every primary node that participates in a distributed transaction (lack of distributed consistency). A backup system in such a condition cannot takeover the transaction processing of the primary system without loss of data integrity.

Thus, there is a need for a recovery procedure and backup system that guarantees that the backup nodes for the primary nodes of a distributed database system have both local consistency and distributed (or network) consistency after a failure of a primary node that participates in a distributed transaction.

BRIEF SUMMARY OF THE INVENTION

An unplanned outage on a primary node of a primary distributed transaction system requires that a takeover procedure occur not just on the backup system for that primary node but on all backup nodes for the nodes of the primary system. In particular, the loss of one of the primary nodes to an unplanned outage, requires that (i) a takeover operation occur on the backup node of the primary node that disappeared; (ii) applications on the surviving primary nodes quit; and (iii) a takeover operation be executed on each of the other backup nodes. The present invention is directed towards the takeover operations on the backup nodes in this circumstance.

One method, in accordance with the present invention, includes a method of backing up a distributed database system that has a plurality of primary nodes, each with a database and transaction monitor, where each primary node is configured to participate in at least one distributed transaction, and each primary node has a backup node with a database. The method includes the steps of performing a local backup operation on the database of each backup node to leave on the backup node's database only those transactions received as committed or aborted from the backup node's primary node and then performing a global backup operation to undo any committed transaction whose presence causes the backup nodes to primary nodes that participated in the distributed transaction to be inconsistent. The step of performing a global backup operation includes finding a common synchronization point among the backup nodes, then producing for each backup node a local commit list that contains all transactions received as committed on each backup node from the common synchronization point through the last committed transaction received on the backup node. Next, the method includes modifying the local commit list at each backup node to mark as undo: (i) committed transactions that are not fully committed and (ii) committed transactions that are potentially dependent on transactions not fully committed. Finally, a network undo list is formed based on the modified local commit list and the updates for those transactions in the network undo list are undone.

One advantage of the present invention is that the backup nodes are quickly ready to support operations in place of the primary system.

Another advantage is that operator intervention is not required to determine whether the backup system is in a consistent and usable state.

Yet another advantage is that backup nodes do not have to be restricted to systems that support only non-distributed transactions. The backup systems are fully generalized to back up nodes that participate in both non-distributed and distributed transactions.

BRIEF DESCRIPTION OF THE DRAWINGS

These and other features, aspects and advantages of the present invention will become better understood with regard to the following description, appended claims, and accompanying drawings where:

FIG. 2 shows a system diagram of a pair of primary nodes and backup nodes for the primary nodes;

FIG. 3 shows the Configuration File Structure;

FIG. 4 shows the Master Audit Trail (MAT) File Structure;

FIG. 7 shows the Master Image Trail (MIT) File Structure;

DETAILED DESCRIPTION OF THE INVENTION

Figure 1:
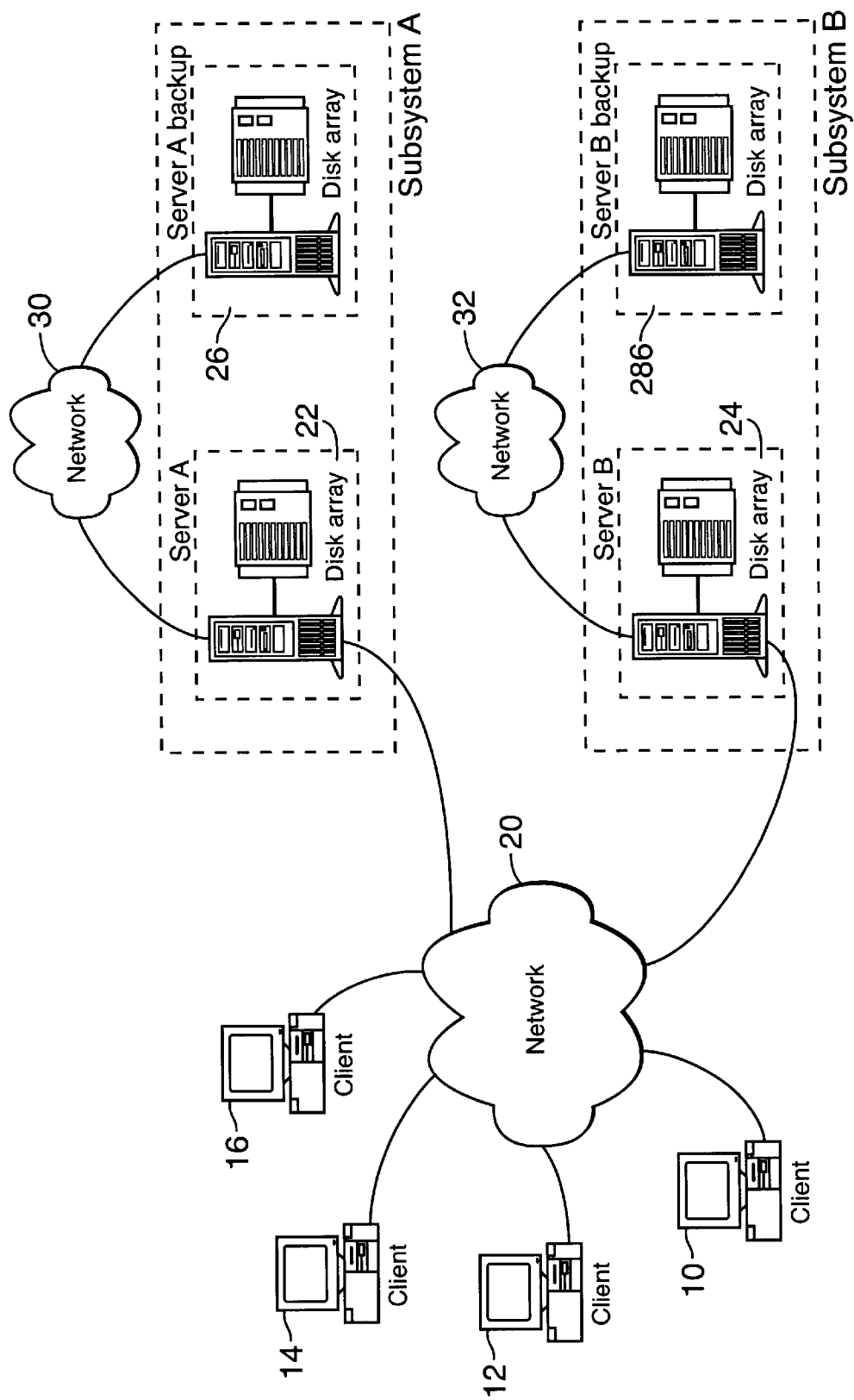
FIG. 1 shows the overall system setting.

FIG. 1 shows the overall system setting. One or more client systems 10, 12, 14, 16 connect via a wide area network 20 to a plurality of primary server systems 22, 24 each having one or more disk volumes. Each server system 22, 24 has its own respective backup system 26, 28 each having one or more disk volumes. The backup systems 26, 28 are not necessarily located geographically in the same place as the primary server systems 22, 24, which they respectively back up. Each backup system 26, 28 communicates with its assigned primary server system 22, 24 via a separate respective network 30, 32. In one case, the network 20 is a wide area network. In another case, the network 20 is the Internet. In yet another case, each backup system 26, 28 communicates via a private leased line with its respective assigned primary system 22, 24.

FIG. 2 shows a system diagram of a pair of primary nodes 38, 40 and respective backup nodes 42, 44 for the primary nodes 38, 40. Each primary system 38, 40 has a primary database 46, 48 that includes a plurality of disk volumes 50a–e, 52a–e, (each of which is preferably a pair of physical disks), a transaction monitor (TM) 54, 56, and a master audit trail (MAT) 58, 60 that is generated by the DBMS. Each backup system 42, 44 includes a plurality of disk volumes 66a–e, 68a–e (each of which is preferably a pair of physical disks) that respectively make up the backup database 62, 64, a master image trail (MIT) 70, 72 and one or more secondary image trails (SIT) 74a–b, 76a–b, and a plurality of processes, that in combination, carry out the backup methods of the present invention. Preferably, each primary volume 50a–e is backed up on a corresponding backup volume 66a–e and each primary volume 52a–e is backed up on a corresponding backup volume 68a–e.

The plurality of processes includes a Monitor process 80, 82, an Extractor process 84, 86, a Receiver process 88, 90, a Purger Process (not shown) and one or more Updater processes 92a–e, 94a–e, one for each backup volume. The Monitor process 80, 82 is a coordinating process for user requests made of the backup system. The Extractor process 84, 86 is configured to access the Master Audit Trail (MAT) 58, 60 of the primary system 38, 40 and generate messages 96, 98 containing audit records, including both update and undo records, from the MAT 58, 60 for the Receiver process 88, 90. The Receiver process 88, 90 is configured to process the messages 96, 98 received from the Extractor 84, 86 and store records derived therefrom in either the Master Image Trail (MIT) 70, 72 or the Secondary Image Trail (SIT) 74a–b. The MIT 70, 72 generally contains timing and transaction state audit records while the SIT 74a–b, 76a–b generally contains the update and undo audit records. The Purger Process periodically deletes image trail files that are not needed by the backup system. The Updater processes 92a–e, 94a–e are configured to access the records stored in the SITs 74a–b, 76a–b and perform database operations on the volumes 66a–e, 68a–e of the backup database to assure that the backup databases 62, 64 are an accurate and up-to-date reflection of the primary databases 46, 48 respectively associated with the backup databases 62, 64 and to assure that the backup database 62 is consistent with other backup databases 64 if one or more transactions is distributed over multiple primary systems.

Hereinafter, a primary system 38, 40 and its respective associated backup system 42, 44 together are referred to as a replication subsystem 100, 102. A primary system 38, 40 and backup system 42, 44 may be referred to as a primary node 38, 40 and back up node 42, 44, respectively. For the purposes of the present invention, one of the replication subsystems is configured to be a master subsystem with a master primary node and master backup node, and the other replication subsystems are configured to be associate subsystems each having an associate primary and associate backup node.

In addition to the above-mentioned processes on the backup nodes, a special synchronization process is added to the network master primary node to perform synchronization transactions across all of the primary nodes that participate in distributed transactions.

A number of data structures are employed in the present invention. They include a Configuration structure stored on each primary and each backup node, a Master Audit Trail (MAT) for each primary node, a synchronization file stored on each primary node, a Master Image Trail (MIT) for each backup node, one or more Secondary Image Trails (SIT) for each backup node, a Local Commit list at each backup node, a Master Commit list at the master node, a Local Undo List for incompleted transactions at each backup node and a Network Undo list for committed network transactions that must be undone at each backup node, an Updater Context Record, a Transaction Status Table (TST), and a Receiver Context Record. Each of these structures is discussed below.

FIG. 3 shows the Configuration File Structure 120 that is stored on the control volume of the primary node and the control volume of the backup system for the primary node. The Configuration File Structure includes a Global Configuration Record 122, a Network Record 124 for each node that participates in a distributed transaction, a Monitor Configuration record 126 for the Monitor process, an Extractor Configuration record 128 for the Extractor process, a Receiver Configuration Record 130 for the Receiver process, a Purger Configuration Record 132 for the Purger Process, an Updater Configuration Record 134 for the Updater Processes, and an Image Trail Configuration Record 136 for the Secondary Image Trails.

The information in the global configuration record includes:

- the node name of the primary system 140;
- the node name of the backup system 142;
- the control volume used by the backup system 144;
- the time that the backup system was initialized 146;
- the name and location of the backup system's log file 148;
- the number of image trails in the backup system 150;
- the number of protected volumes, which is also the number of Updaters in the backup system 152,
- the number of message buffers used by the backup system 154;
- information about whether the backup system is part of the master replication subsystem 156; and
- other non-relevant information.

Each of the various process configuration records such as 130 includes information 158 identifying the processing elements on which that process and its backup process runs, the priority assigned the process, the name of the process and so on. In addition, the Receiver configuration record also specifies the size of the image trail files and the volume used to store the Master Image Trail files.

In a preferred embodiment, the Network Record 124 for the network master includes the names of the primary nodes 160 and backup nodes 162 for each replication subsystem, their control subvolumes 164, their synchronization file volumes 166. The Network Record 124 also contains the tx_id_prev field 167 for storing the common synchronization point (discussed below). The associate subsystems have, in their Network Record 124, information that enables them to access the master subsystem and its Network Record 124.

The Purger Configuration Record 132 includes a parameter called the Image Trail File Retain Count 168, which indicates the minimum number of image trail files to be retained for each image trail.

The Updater Configuration Record 134 identify the Image Trail 170 from which the associated Updater Process is to read audit information, the primary volume ID 172 whose audit information is to be processed by the Updater, and the backup volume ID 174 to which the database updates are to be applied by the Updater.

Each Image trail Configuration Record 136 identifies the disk volume ID 176 on which the image trail files for the corresponding image trail are to be stored.

FIG. 4 shows the Master Audit Trail (MAT) File Structure 180. The Master Audit Trail includes a plurality of TMP Control Point Records 182a–c between which are stored any number of different record types, such as Data Records 184a–c 190a–c, Transaction State Records 186a–c, 192a–c and Stop Updaters records 188 194. TMP Control Point Records 182a–c are timing markers inserted by the Transaction Monitor of the primary system into the Master Audit Trail 58, 60 in FIG. 2 at varying intervals that depend on the system's transaction load. In one implementation, during heavy transaction loads (about 200–500 Transaction per second), TMP Control Point Records 182a–c are inserted approximately a minute or less apart; during moderate transaction loads, TMP Control Point Records 182a–c are inserted approximately 5 minutes are apart; and under light transaction loads the interval between successive TMP Control Points 182a–c is approximately 30–45 minutes. The interval between successive TMP Control Points 182a–b, 182b–c is called a Control Point Interval.

Transaction State Records 186a–c, 192a–c are records that indicate the state of a transaction that persists across or terminates in a Control Point Interval. A Transaction State Record 186a includes the transaction ID 196 of the transaction whose state is being reported. The state of a transaction includes whether the transaction is alive 198, committed 200 or aborted 202. The alive state 198 includes the states of either aborting 204, prepared 206 or active 208. Every alive transaction, i.e., a transaction in the "unknown" state, is guaranteed to produce a transaction state record during each Control Point Interval.

Any number of Data Records 184a–c, 190a–c can be stored in a Control Point Interval. Data Records 184a–c, 190a–c include update records 210, backout (undo) records 212, and special update records called synchronization records 214. Update records 210 reflect changes to a database volume made by a transaction by providing before and after record images of the updated database record. Each update record indicates the transaction ID of the transaction that made the database change and the identity of the database volume and database record that has been updated.

Synchronization records 214 are update records 210 of a distributed transaction to a special file that are caused to be generated by master replication system in each of the nodes of the distributed transaction system. Each synchronization audit record 214 contains a counter 216 that monotonically increases for each additional transaction encountered on a subsystem, a current transaction ID, tx_id_current 218, for the transaction that most recently changed the counter's value, the a previous transaction ID, tx_id_prev 220, for the transaction immediately prior to the current transaction and the synchronization file name 222.

Backout audit records 212 reflect the reversal of previous changes made to a database volume. The database changes represented by backout records are indicated by before and after record images of the updated database record. Backout audit records 212 are created when a transaction is aborted and the changes made by the transaction need to be reversed. Each backout audit record indicates the transaction ID of the transaction that made the database change, the identity of the database volume, and database record that has been modified by the backout.

Figure 5A:
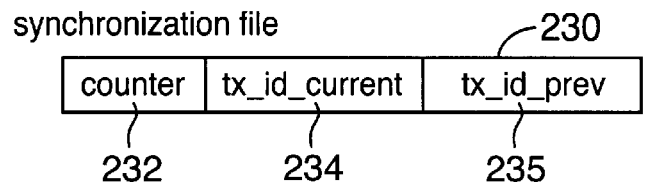
FIG. 5A shows the Synchronization File on primary nodes.

FIG. 5A shows the Synchronization File 230 that is present on the primary nodes. The Synchronization File 230 includes a record that contains a synchronization counter field 232, the tx_id_current field 234, and the tx_id_prev field 235. The synchronization record gets recorded in the MAT 180 because of the synchronization process described below.

Figure 5B:
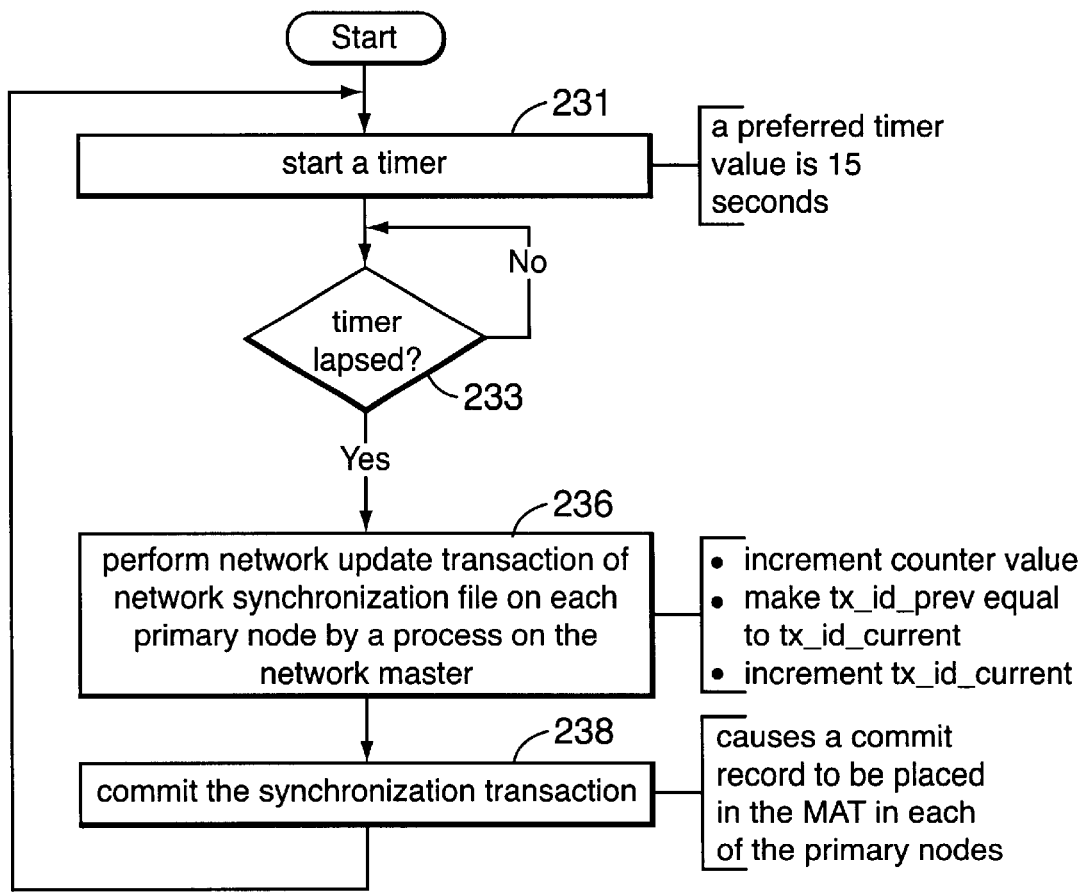
FIG. 5B shows a flow chart for the Synchronization process on the primary nodes.

The network master includes a network synchronization process, set forth in FIG. 5B, that is configured to perform a network transaction update to the Synchronization File 230 on each primary node in a system supporting network transactions. The Synchronization File, as described above, contains a synchronization record that includes a counter, a transaction ID for the current synchronization transaction, tx_id_current, and a transaction ID for the previous synchronization transaction, tx_id_prev.

Referring to FIG. 5B, the network synchronization process starts a timer, in step 231, that has a preferred value of about 15 seconds as its timeout time. When the timer lapses, as determined in step 233, at the end of the 15 second interval, the network synchronization process starts a network update transaction, in step 236, on the special file at each primary node. This update increments the counter value in the file by one, makes the tx_id_prev value equal to the tx_id_current value, and then sets the tx_id_current value to the value of the current network update transaction identifier. After the update, the transaction is committed, in step 238, which causes a commit record to be placed in each primary node's master audit trail (MAT). Note that the tx_id_prev represents a guaranteed committed synchronization transaction on all participating primary nodes. Because this is a distributed transaction that touches all of the primary nodes, the MAT on each primary node records the transaction. The audit record for the synchronization transaction includes the before image of the file and the after image of the file for each update. If a synchronization update is aborted instead of committed, as is a possibility with any transaction, an abort flag is set in the update that performs the undo of the previous, normal update. Both the normal update and the undo update show up in the MAT.

Figure 6:
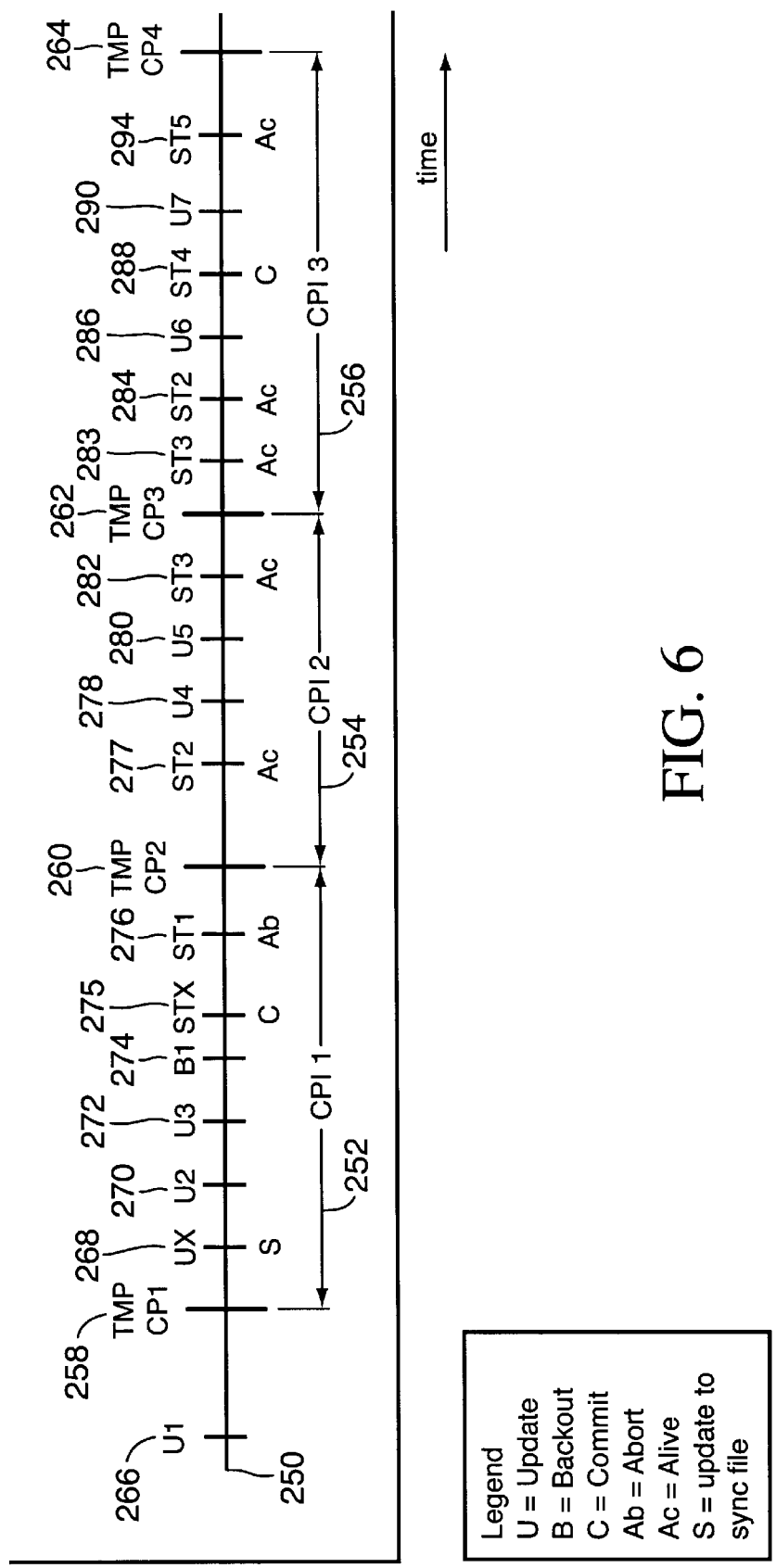
FIG. 6 shows a representative MAT Timeline.

FIG. 6 shows a representative MAT Timeline 250 to illustrate the possible contents of a Master Audit Trail. In regard to FIG. 6, an update is an original application update and backout is and undo of that original application update. The term update is also used in this document to refer to both the original application update or a backout. There are three complete Control Point Intervals 252, 254, 256 defined between four TMP Control Points, TMP CP1 258, TMP CP2 260, TMP CP3 262, TMP CP4 264. Prior to CP1 258 an update for transaction 1 266 occurs. During the first complete control point interval 252, from CP1-CP2, an update to the synchronization file 268, an update for transaction 2 270, an update for transaction 3 272, a backout of transaction 1 274, a status 275 for the synchronization transaction, and a status for transaction 1 276 are recorded. The status 275 indicates that the update 268 of the synchronization transaction as committed. The status 276 indicates that transaction 1 is aborted. In the next interval 254, from CP2-CP3, a status of transaction 2 277, an update for transaction 4 278, an update for transaction 5 280, and a status of transaction 3 282 are recorded. The status 277 of transaction 2 is alive, and the status 282 of transaction 3 is alive. During the next interval 256, from CP3 to CP4, a status for transaction 3 283, a status for transaction 2 284, an update for transaction 6 286, a status of transaction 4 288, an update for transaction 7 290, and a status of transaction 5 294 are recorded. The status 283, 284, 294 of transactions 2, 3 and 5 is alive. The status of transaction 4 288 is committed.

FIG. 7 shows a block 300 within the one or more Master Image Trail (MIT) Files. The MIT block has a header 302 and one or more Transaction Control Records 304*a–c* between which Transaction State Records 306*a–c*, 308*a–c* are recorded. The header 302 includes:

a Blk Psn 310 that indicates the relative byte address of the beginning of the block with respect to the beginning of the image trail file;

a pointer 314 to the first audit image record to start in the buffer block;

a pointer 316 to the end of the last record to complete in the block;

a pointer 318 to the next available byte in the block (if there is one); and the MAT position 320 of the audit image record at the beginning of the buffer block.

Transaction state records 306*a–c*, 308*a–c* record the state of a particular transaction. The state can be either Committed 322, Aborted 324, Aborting 326, Prepared 328, and Active 330, as was described regarding the MAT. Essentially, the MIT includes only the TMP Control Point and Transaction State records from the MAT along with header information to describe the position of a block header (the beginning of a block) within a sequence of image trail files and information about the location of image records within the block.

Figure 8:
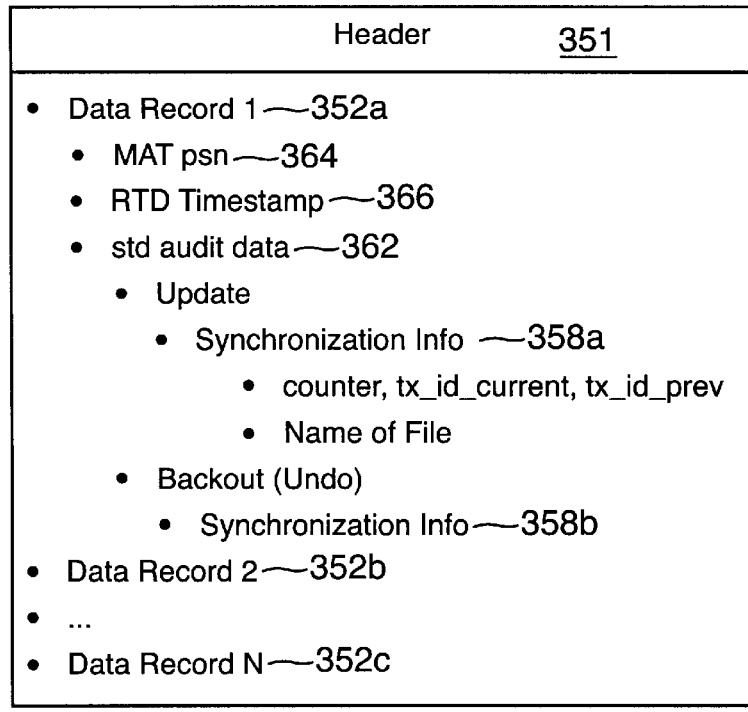
FIG. 8 shows the Secondary Image Trail (SIT) File Structure.

FIG. 8 shows the Secondary Image Trail (SIT) File Structure 350. This structure includes the data records 352*a–c* from the MAT. Synchronization records 358*a–b* are included because they are update records to the synchronization file. Also included, in addition to the standard audit data 362 are the MAT psn 364 and RTD Timestamp 366 which are added by the Extractor when it reads the MAT. A header 351, similar to the header 302 in the MIT, is used to identify a particular SIT file and position of the block within the file.

Figure 9:
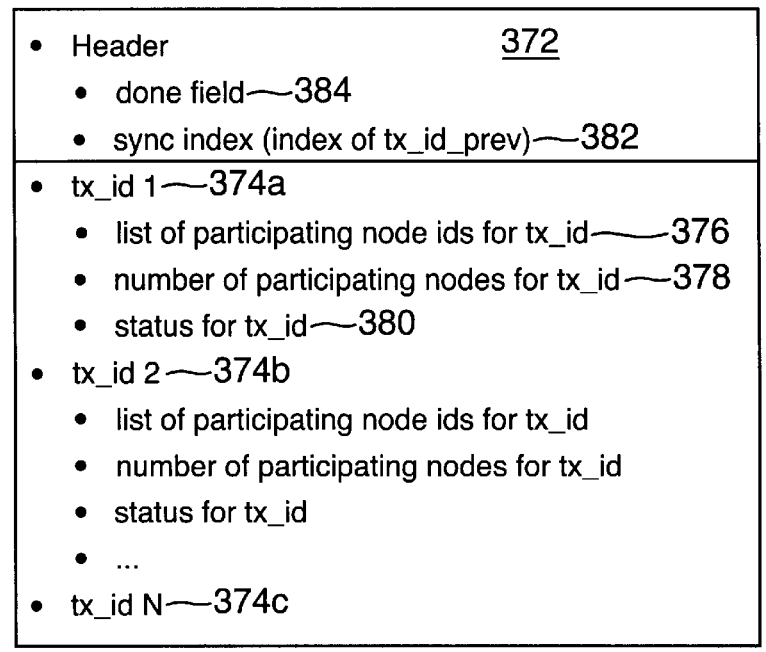
FIG. 9 shows the Local Commit List and Master Commit List structure.

FIG. 9 shows the Local Commit List and Master Commit List structure 370. Each of these lists has a header 372 and one or more transaction IDs 374*a–c*. The header includes the sync index of the transaction ID 382, and a done field 384 which indicates when it is safe to read a completed Local Commit or Master Commit List. For each transaction ID, information about the transaction is stored. This information indicates the list of participating nodes 376 for the particular transaction, the number of participating nodes 378, and the status 380 for the transaction ID.

Figure 10:
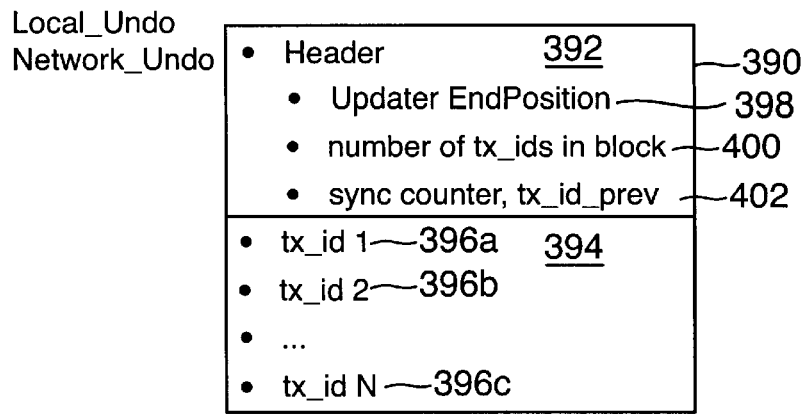
FIG. 10 shows the Local Undo and Network Undo structure.

FIG. 10 shows the Local Undo and Network Undo structure 390. Each of these structures has a header 392 and a body 394, which is a list of transaction IDs 396*a–c*. The header includes the Updater End Position 398, the number of tx IDs in the block, 400 and the sync counter and tx_id_prev 402.

Figure 11:
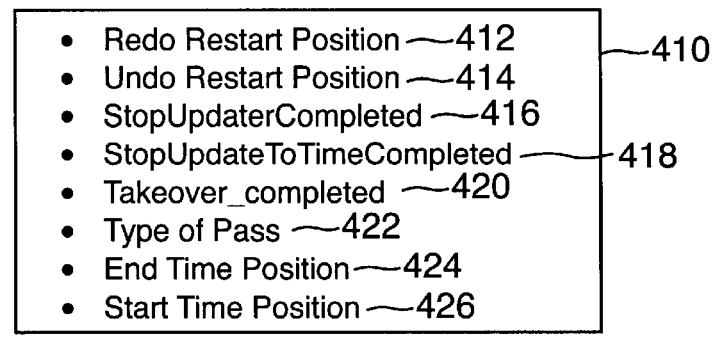
FIG. 11 shows the Updater Context Record.

FIG. 11 shows the Updater Context Record 410. This record is stored for the Updater so that it can be restarted if a failure occurs during an Updater operation. Included are:

the Redo restart position 412, which indicates the position of the record immediately following the last image trail record processed by the Updater before the last Updater context save operation during a Redo Pass;

the Undo restart position 414, which indicates the next image trail record to process during an Undo pass after the last Updater context save operation;

a StopUpdaterCompleted flag 416, which is set when the Updater has stopped operation in response to read a Stop Updaters record;

a StopUpdateToTime Completed 418 which is a timestamp based Restart position used to indicate where to restart processing image trail records after performing a Stop Updaters at Timestamp operation;

a Takeover_Completed Flag 420 that is set when the Updater completes processing all the records in its image trail during an RDF takeover operation;

a Type of Pass indicator 422, which indicates whether the Updaters are performing a Redo pass or an Undo pass;

an End Time Position 424, which indicates the record last processed at the end of a Redo pass, while performing a Stop Updater at Timestamp operation;

a Start Time Position 426, which indicates the last record to be undone during an Undo Pass, and thus indicates the first record to be processed (for redo) when the Updater is restarted after completing a Stop Updater at Timestamp operation.

Figure 12:
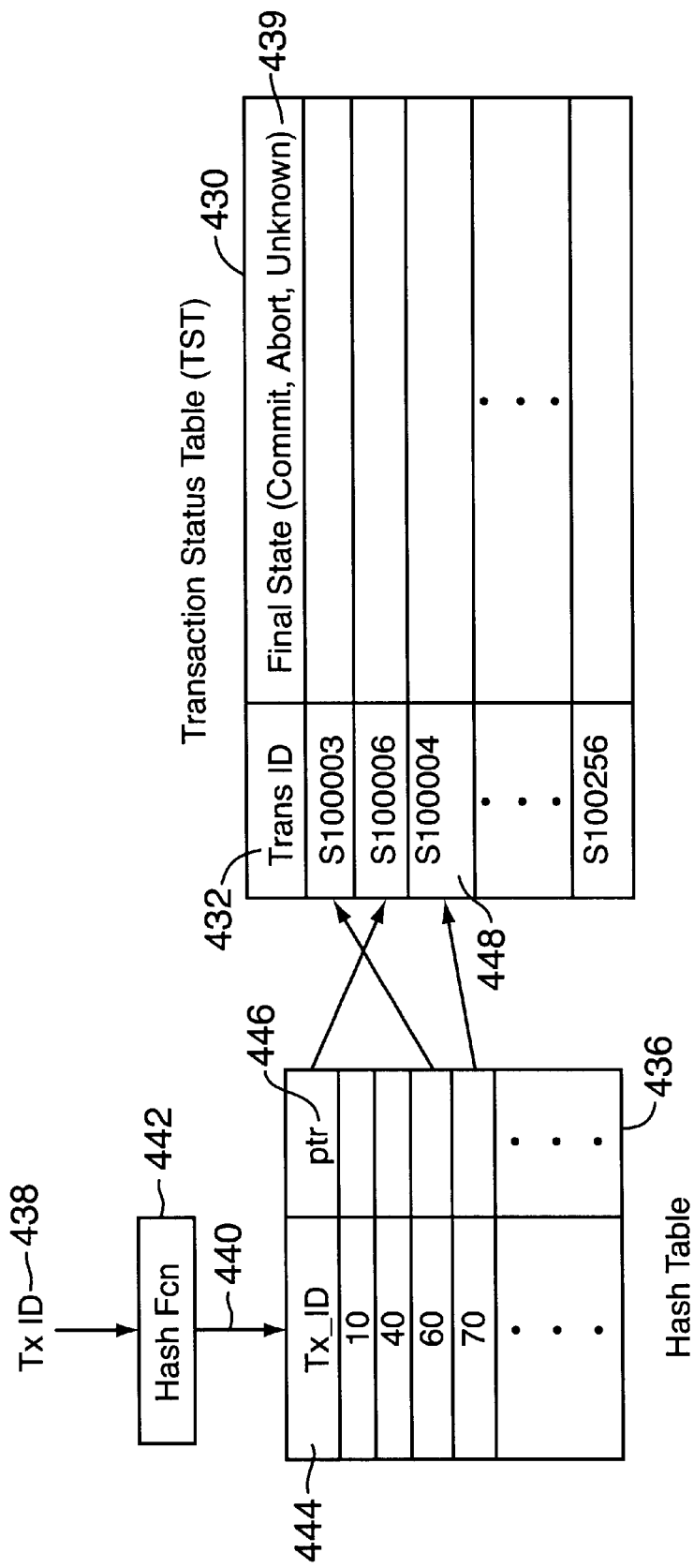
FIG. 12 shows the Transaction Status Table.

FIG. 12 shows a preferred embodiment of a Transaction Status Table 430 which stores, for each transaction in the table, the transaction ID 432, and the final state of the transaction 434, if it is known. A hash table 436 is used to locate items in the TST 430. The transaction identifier, TxID 438, of a transaction is converted into a hash table index 440 by a hash function 442. An item 444 in the hash table 436, either at the index position or after the index position, contains a pointer 446 to the TST entry 448 for that transaction. The TST 430 is preferably filled with entries in sequential order, starting at either the top or bottom of the TST. Many other structures for the TST are possible. One alternative structure, in which each hash table pointer points to a linked list, is equally suitable for the TST.

Figure 13:
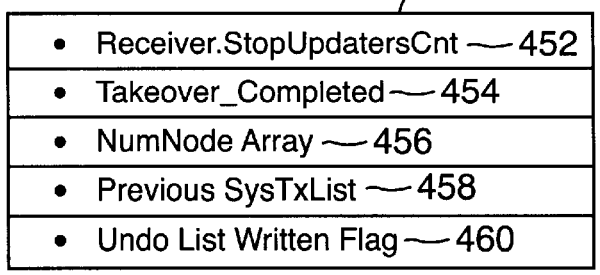
FIG. 13 shows the Receiver Context Record.

FIG. 13 shows the Receiver Context Record 450. This record, recorded periodically for the Receiver, contains a Receiver.StopUpdatersCnt 452, a Takeover_Completed flag 454 that is used to indicate when an RDF takeover operation is completed, a NumNode array 456 and a previous SysTx-List 458 which is used for purging old image trail files. An Undo List Written Flag 460 indicates when an Undo List is ready.

Figure 14:
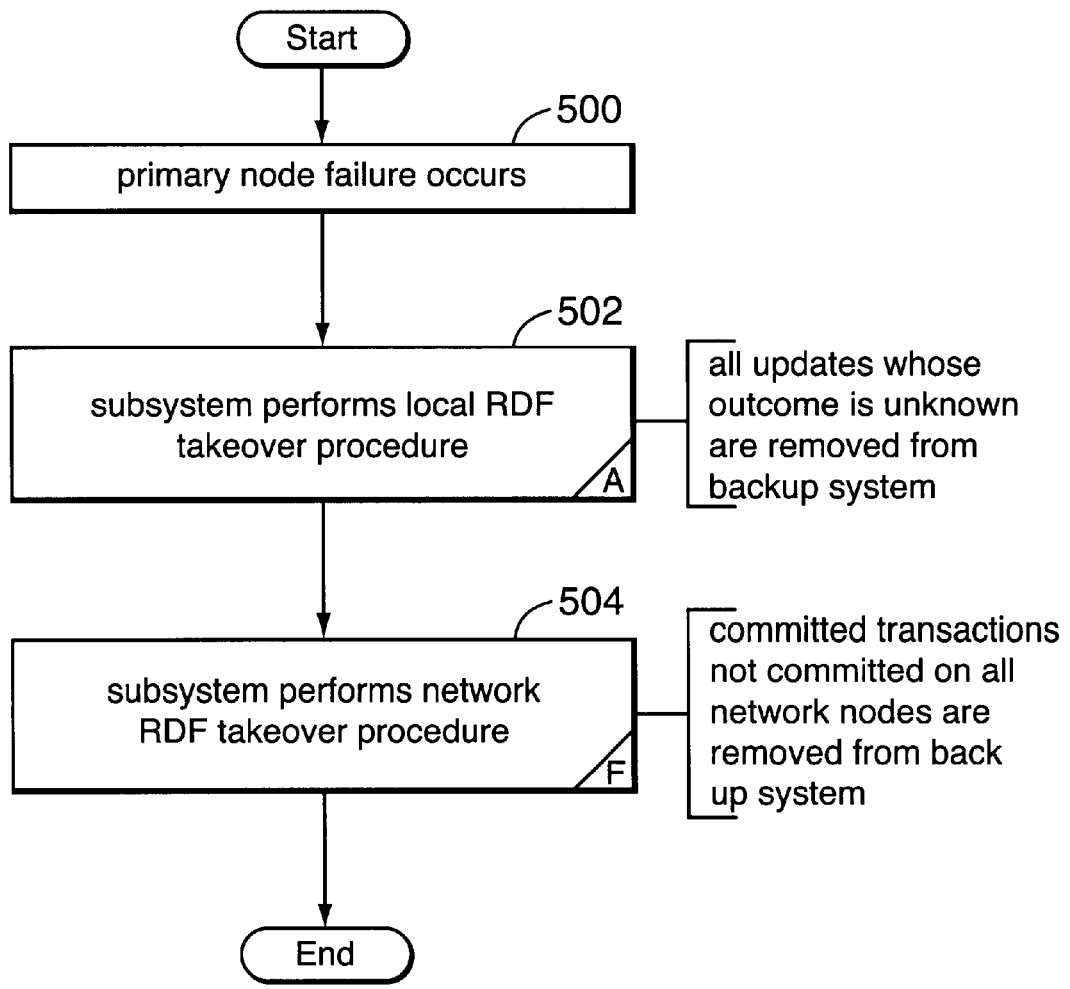
FIG. 14 shows the Flow Chart for Overall Takeover Process.

FIG. 14 shows the Flow Chart for Overall Takeover Process. As indicated, the RDF Takeover procedure has two phases, a Local RDF phase in step A 502, and a Network RDF phase in step F 504, which occur when there has been a primary node failure 500. The Local RDF phase 502 removes all updates whose outcome is unknown from a backup system to create a state of local consistency on the backup nodes. All incomplete transactions are undone leaving only commits and aborts in the backup system. The Network RDF phase 504 then removes certain committed distributed transactions that cannot be kept in the backup system to create a state of network or distributed consistency on the backup nodes. Distributed consistency derives from the requirement that distributed transactions must commit at all backup nodes whose primary nodes participated in the transaction or not at all. Committed transactions failing to meet this requirement must be undone at all of the backup nodes whose primary nodes participated in the transaction and transactions that potentially depended on those committed transactions must be undone as well on all of those backup nodes.

First the Local RDF takeover procedure 502 is described followed by the Network RDF Takeover procedure 504. The following conventions are used in the flow charts. A tagged step indicates a more detailed flow chart for the operation recited in the tagged step. An unprimed character is an entrance into the more detailed procedure and the corresponding primed character is a return from the more detailed procedure back to the higher level procedure that called it.

Figure 15A:
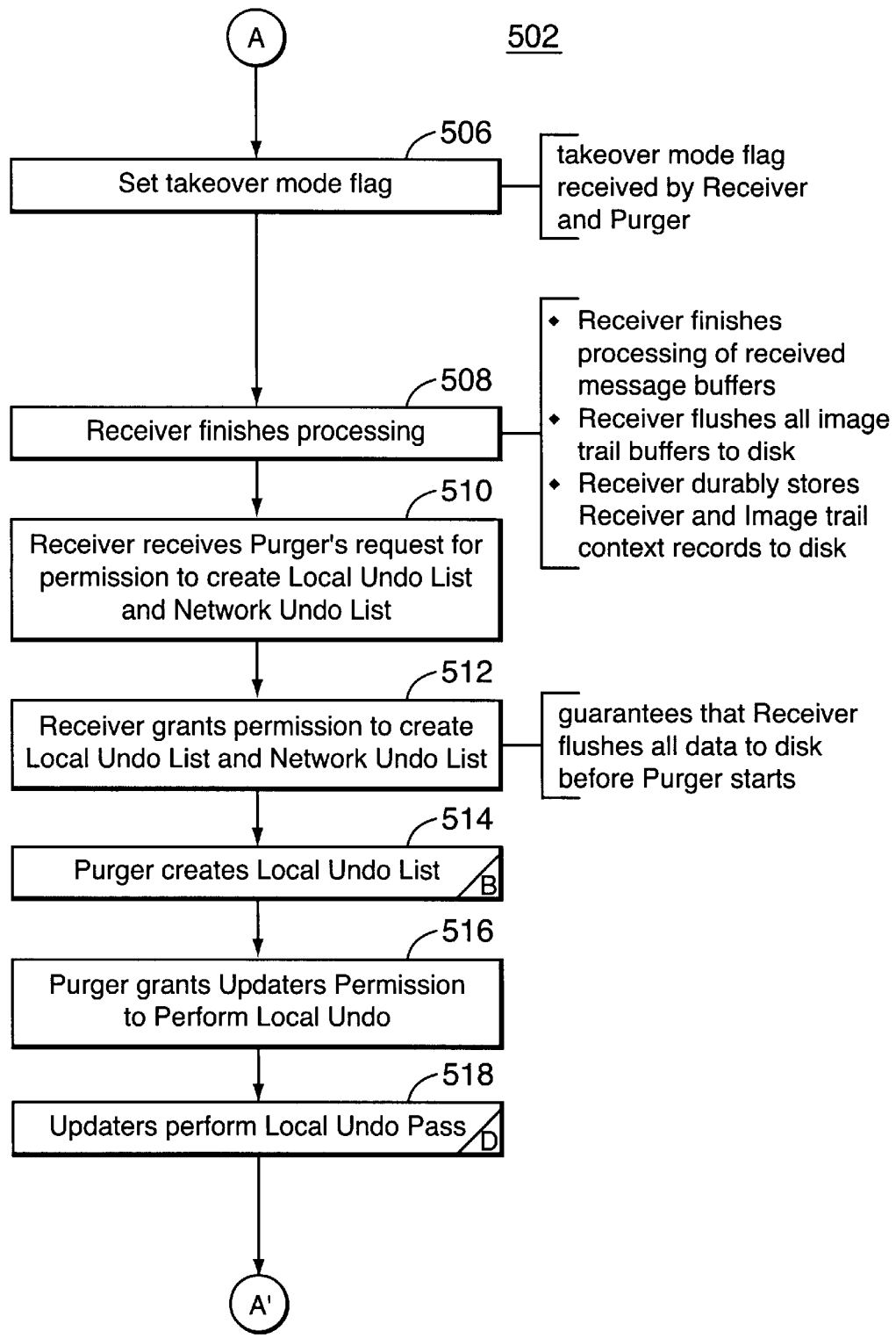
FIGS. 15A-E show the Flow Charts for Local Takeover Process.

A top level diagram for the Local RDF takeover procedure, A 502, is shown in FIG. 15A. Because of the primary node failure, a Takeover mode flag is set, in step 506. This flag is received by both the Receiver and Purger processes. The Receiver then, in step 508, finishes any processing of its received message buffers, flushes all of the image trail buffers to disk and durably stores the Receiver and Image Trail Context Records to disk. Next, in step 510, the Receiver receives a request from the Purger for permission to create a Local Undo List and a Network Undo List. These two Undo Lists are the central lists for restoring data on each volume to a consistent state. When the Receiver is finished with its processing, the Receiver grants permission, in step 512, to create the Local Undo List and the Network Undo List. This guarantees that the Receiver flushes all data to disk before the Purger starts.

In detailed chart B, step 514, the Purger creates the Local Undo List, following which the Purger grants, in step 516, the Updaters permission to actually perform the Local Undo Pass. In detailed chart D, step 518, the Purgers perform the Local Undo Pass.

Creating the Local Undo List (Detail B)

Figure 15B:
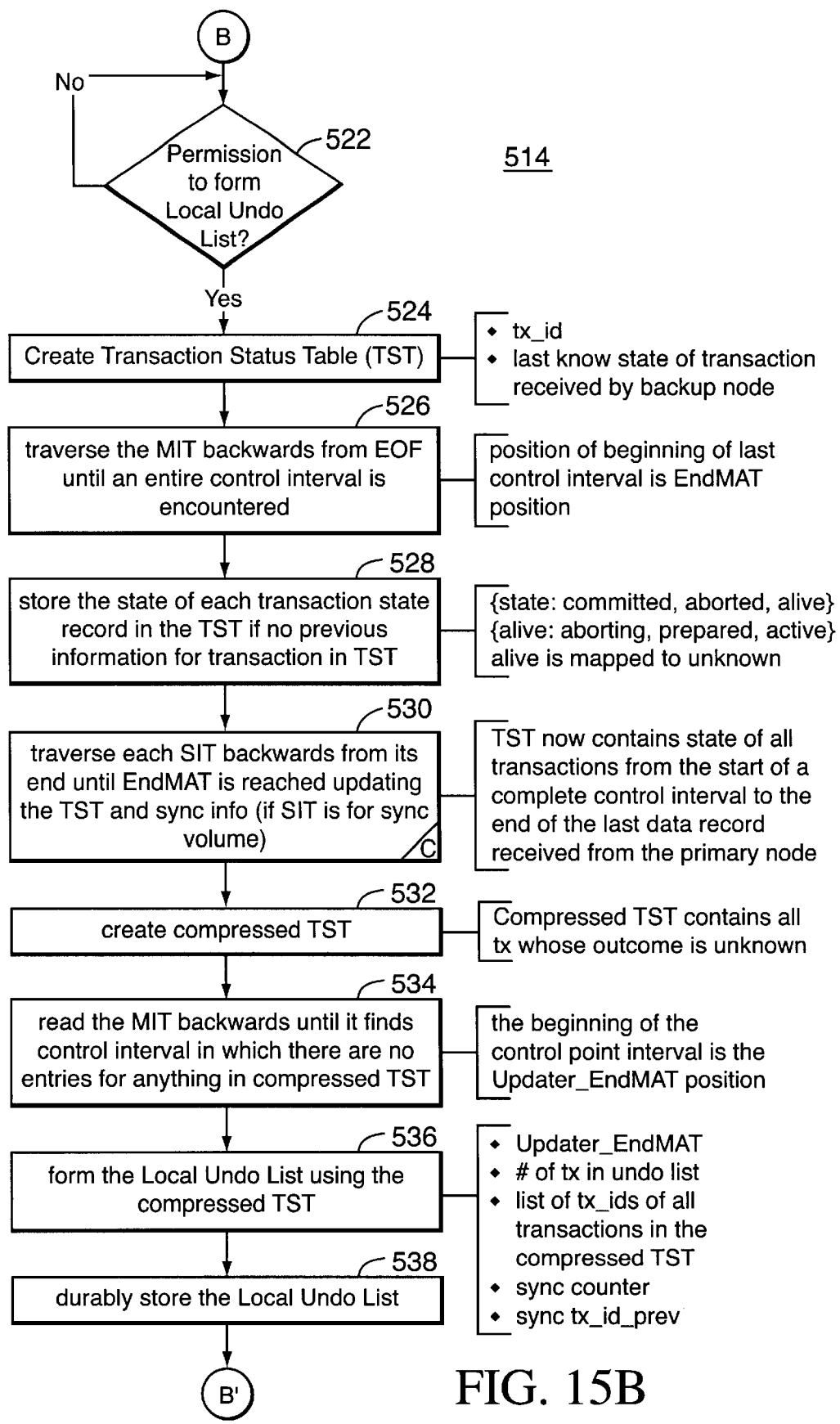
Figure 15C:
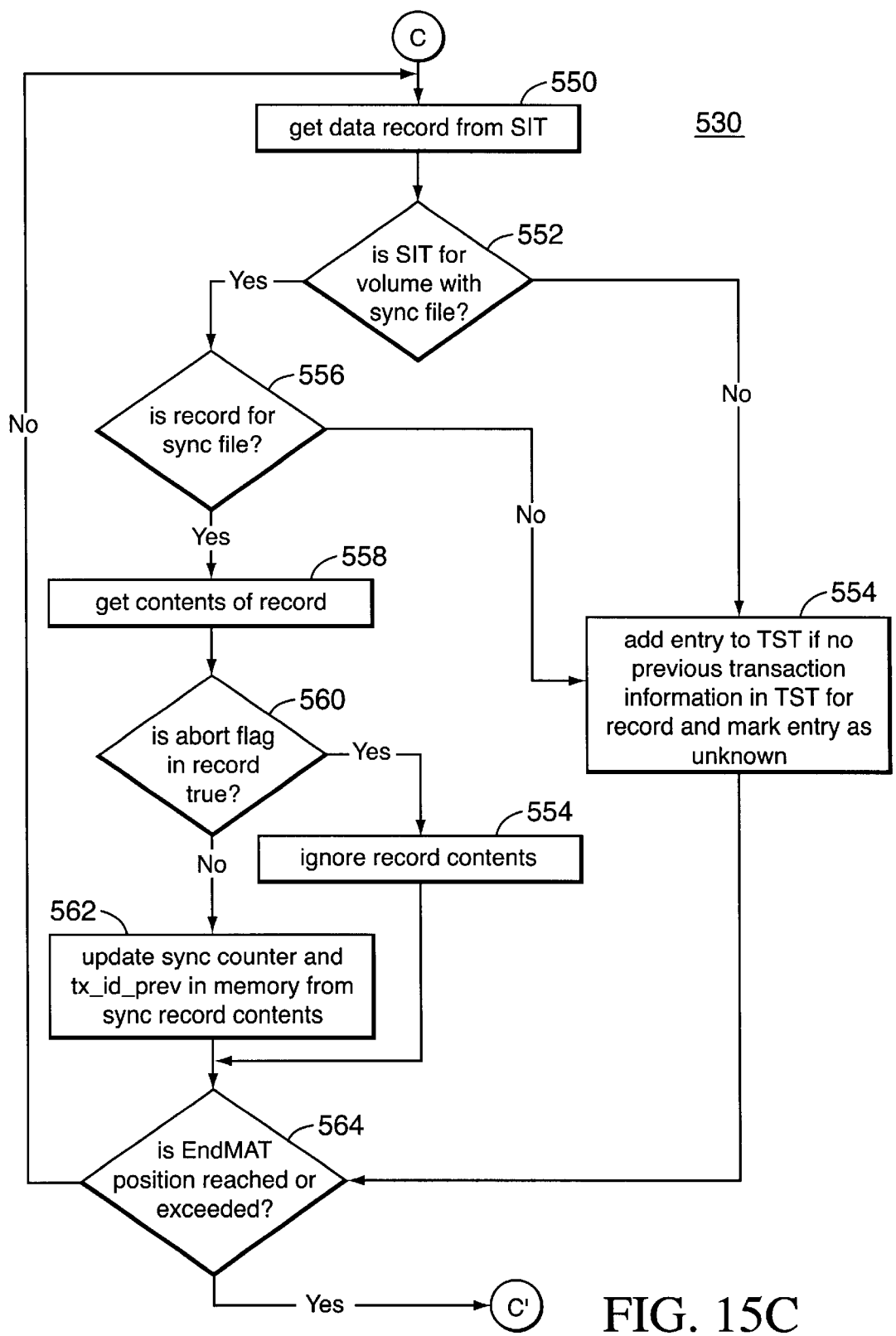

FIG. 15B, detail B, shows the steps for creating a Local Undo List. Upon receiving permission, in step 522, to form the Local Undo list, the Purger creates a Transaction Status Table (TST), in step 524. As described above, this table contains a tx_id field for each transaction in the table, and the last known state of the transaction received by the backup node. Next, in step 526, the Purger traverses the MIT backwards from the end of file (EOF) until an entire TMP Control Interval is encountered. The position at the beginning of the this control interval is called the EndMAT position. During the backward traversal, the state of each transaction state record encountered in the MIT is stored, in step 528, in the TST if there was no entry for the transaction in the TST. The state stored is either committed, aborted, and unknown which is mapped to the alive state. Next, in step 530, the SIT is traversed backwards from its EOF until the EndMAT position is reached, during which traversal, an entry, marked as "unknown," is added to the TST if there was no previous transaction information in the TST for the record in the SIT, and the synchronization information is updated, if the SIT being scanned is for a volume on which the synchronization file is stored. The details of this operation are presented in detail C (FIG. 15C). At this point the TST now contains the state of all transactions from the start of a complete control interval to the end of the last data record received from the primary node. Following the traversal of the SIT, the TST is now compressed, in step 533, so that it contains all transactions whose outcome is unknown. Preferably the compression occurs by forcing entries with an unknown status towards the top of the TST table.

At this point the MIT must again be traversed backwards, in step 534, this time to find a control point interval in which there are no entries for anything in the compressed TST. The beginning of this control point interval is the Updater_ EndMAT position. Next, in step 536, the Local Undo List is formed using the compressed TST. The Local Undo list now contains the Updater_EndMAT, the number of transactions in the Undo List, a list of all tx_ids of all transactions in the compressed TST, the sync counter and the sync tx_id_prev. Finally, in step 538, the Local Undo List is durably stored.

SIT Scanned (Detail C)

FIG. 15C, detail C, sets forth the steps for updating the TST from the SIT and updating the synchronization information when the SIT is for the volume on which the synchronization file is stored. In step 550, a data record from the SIT is obtained and if the record is not for the volume with the synchronization file, as determined in step 552, an entry marked as "unknown" is added to the TST in step 554. The EndMAT position is tested to determine whether it has been reached or exceeded. If not the next record from the SIT is obtained, in step 550. However, if the SIT being scanned is the one on which the synchronization file is stored, as determined in step 552, then the record must be examined. If the record is not a synchronization record, as determined in step 556, an entry marked as "unknown" is added to the TST, in step 554, if there is no information regarding the transaction in the TST. Otherwise, the record contents are obtained, in step 558, and examined. In the synchronization record there is a flag indicating whether the synchronization record itself part of an aborted transaction. The flag is tested, in step 560, and if false, an in-memory image of the synchronization counter and tx_id_prev are updated, in step 562, from the synchronization record. If the flag is tested and found true, the synchronization record is ignored, in step 554. Following either the true or false outcome, the EndMAT position is tested, in step 564, to determine if the SIT has been scanned backward far enough. If not, processing of the SIT records continues in the above fashion until the EndMAT position is found. At the end of detail C, the sync counter contains a value for the earliest, committed, synchronization record in a complete control point interval.

Updaters Perform Local Undo Pass (Detail D)

Figure 15D:
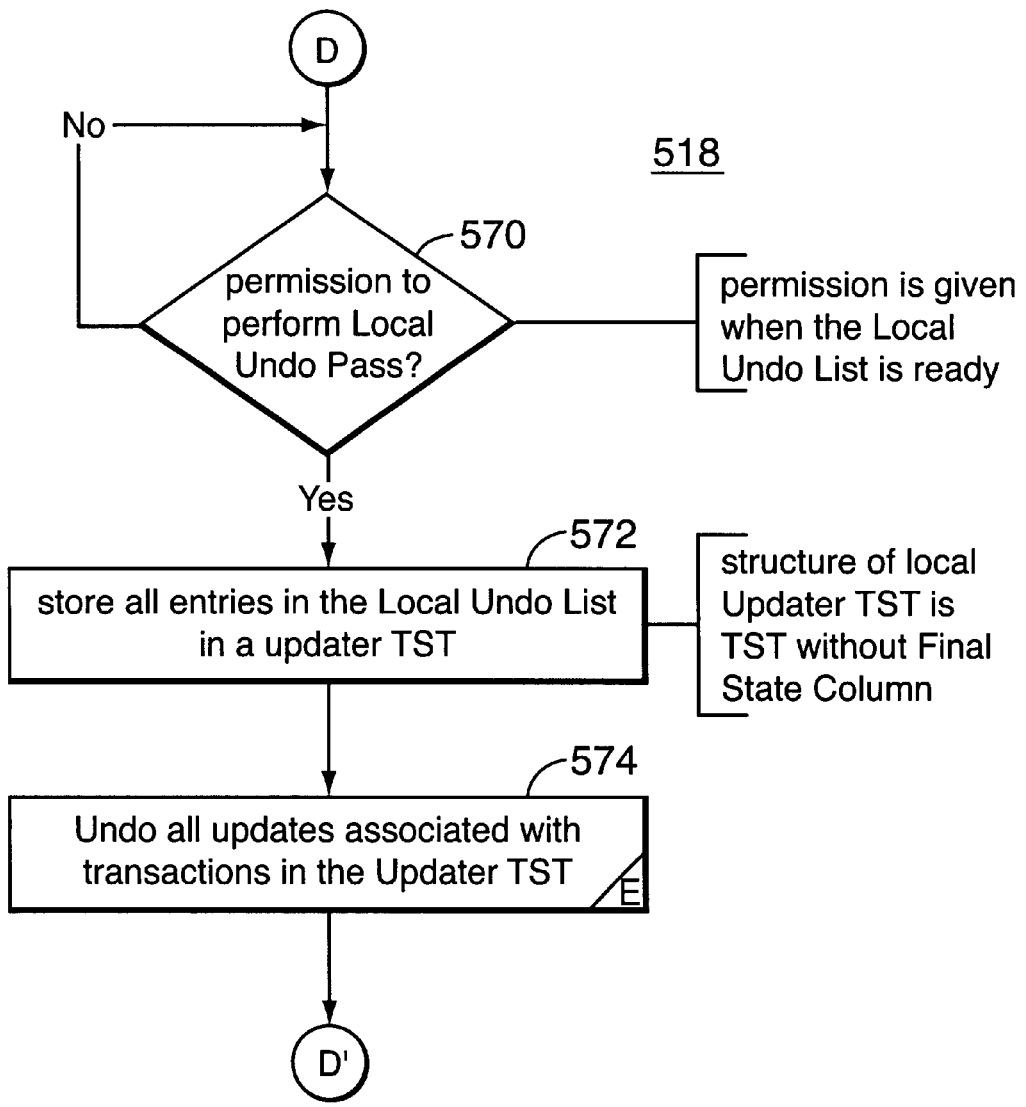

FIG. 15D, detail D, sets forth the step for performing a Local Undo Pass by the Updaters. Upon receiving permission, in step 570, to perform the Local Undo pass when the Undo List is ready, the Updaters then store, in step 572, all of the entries of the Local Undo List into the Updaters TST. The structure of the Updater TST is the same as the TST but without the Final State column. Following this, the Updaters, in step 574, actually undo all updates associated with transactions in the Updater TST as shown in detail E (FIG. 15E).

Updaters Undo Updates (Detail E)

Figure 15E:
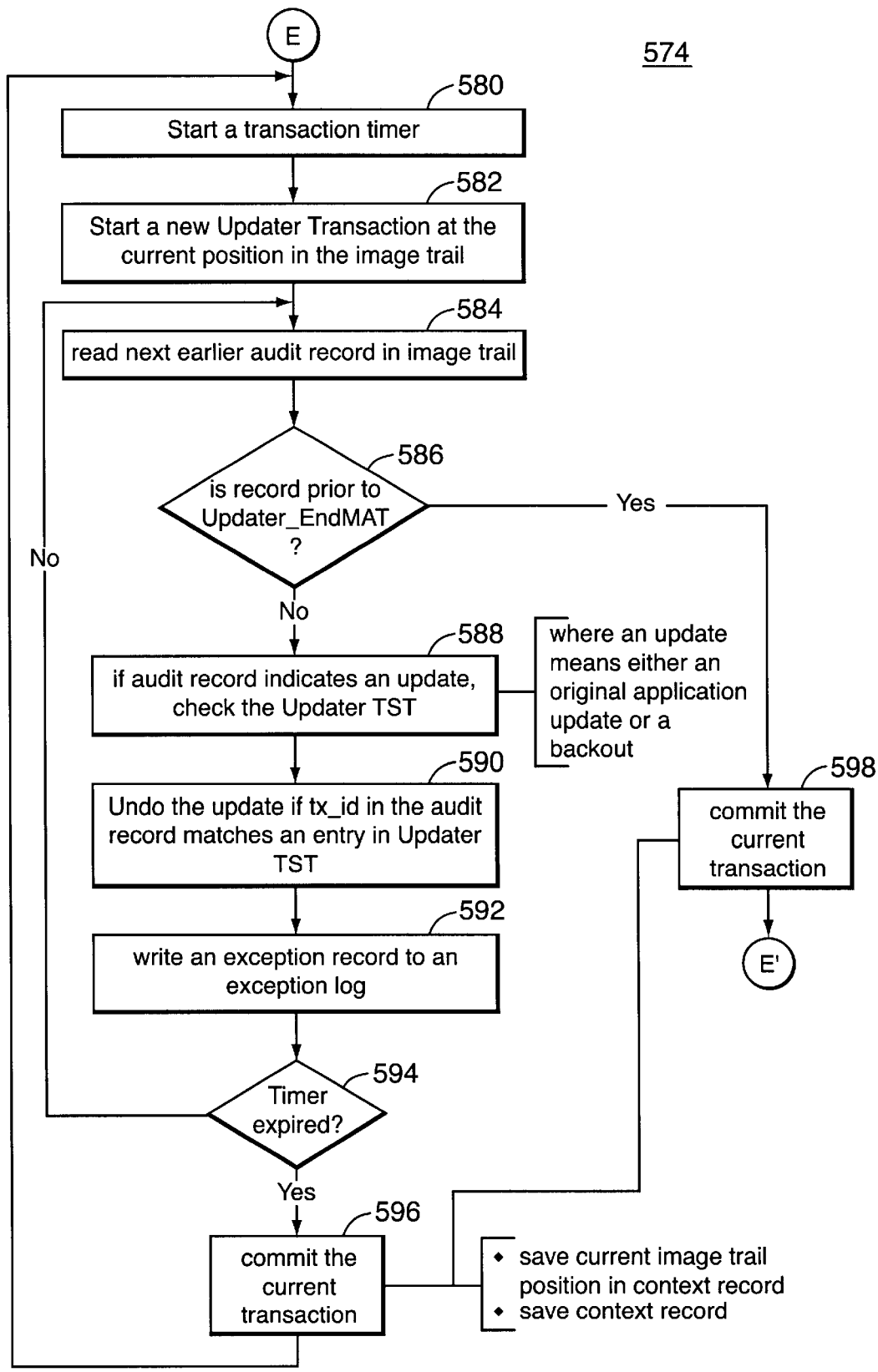

FIG. 15E sets forth the steps for actually undoing the updates in according to the Updater TST. First, in step 580, a transaction timer is started because the undo operation is a transaction that is itself audited. An Updater Transaction is started, in step 582, at the current position in the image trail. The next earlier record in the SIT is read, in step 584, and a test is made, in step 586, to determine whether the record is prior the UpdaterEndMAT position. If not, then if the audit record indicates an update record, the Updater TST is checked, in step 588, to see if the update should be undone, where update is used in a general sense to refer to either an original application update or a backout of an original application update. If the tx_id in the audit record matches an entry in the Updater TST, then the update is undone, in step 590, and an exception record is written, in step 592, to an exception log so indicating. The timer is tested, in step 594, to determine if it has expired and if not, the next earlier record in the SIT is read, in step 584, and similarly examined. Assuming that the Updater_EndMAT position is not reached after a number of audit records of the SIT are examined, then timer eventually lapses, as determined in step 594, and the transaction of undos is committed, in step 596. When the transaction is committed, the current position in the image trail is recorded in the Updater's context record and the context record is saved in case the Updater itself fails. In the event of an Updater failure, the Updater can read the last context record and begin processing where it left off before the failure. If the Updater_EndMAT position is reached, as determined in step 586, before the timer expires, then the current transaction is committed, as just described.

At this point, each volume in a backup system has had all updates whose outcomes are unknown removed. The volumes now contain only transactions that were either committed or aborted and as such are in a locally consistent state. However, as discussed above, it may be necessary to mark, as undo, some of the committed transactions to preserve the network or distributed consistency of the backup systems. In particular, unless each transaction was received as committed on all of the backup nodes whose primary nodes participated in the transaction, then those transactions, though committed, must be removed from the backup system. Furthermore, the removal of some of these committed transaction may necessitate the removal of other committed transactions that potentially depend on a removed committed transaction in order to achieve network consistency.

The Network Takeover Process (Detail F)

Figure 16:
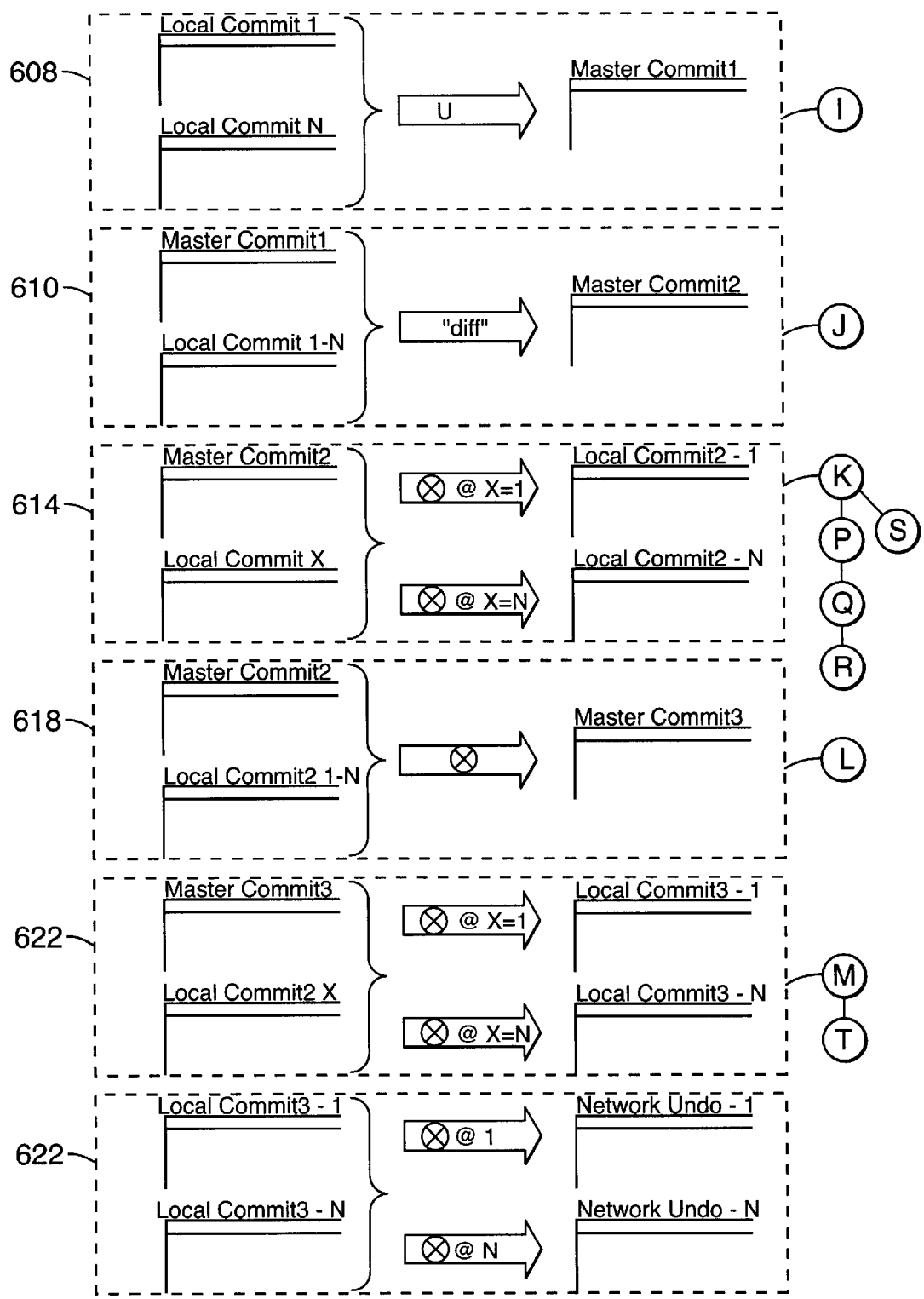
FIG. 16 shows a conceptual view of the Network Takeover Process.
Figure 17A:
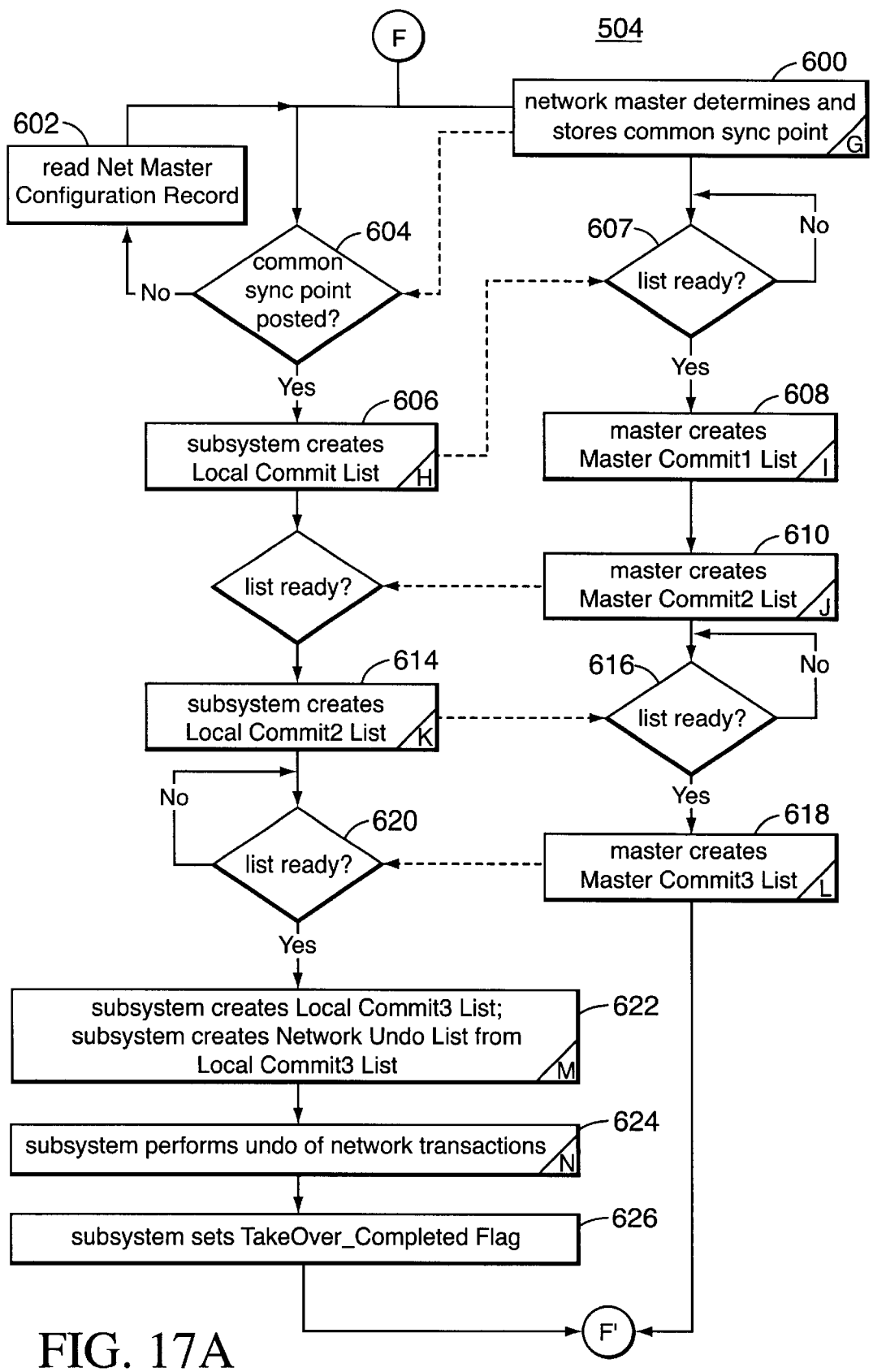
FIGS. 17A-N, 17P, and 17Q show the Flow Charts for Network Takeover Process.
Figure 17B:
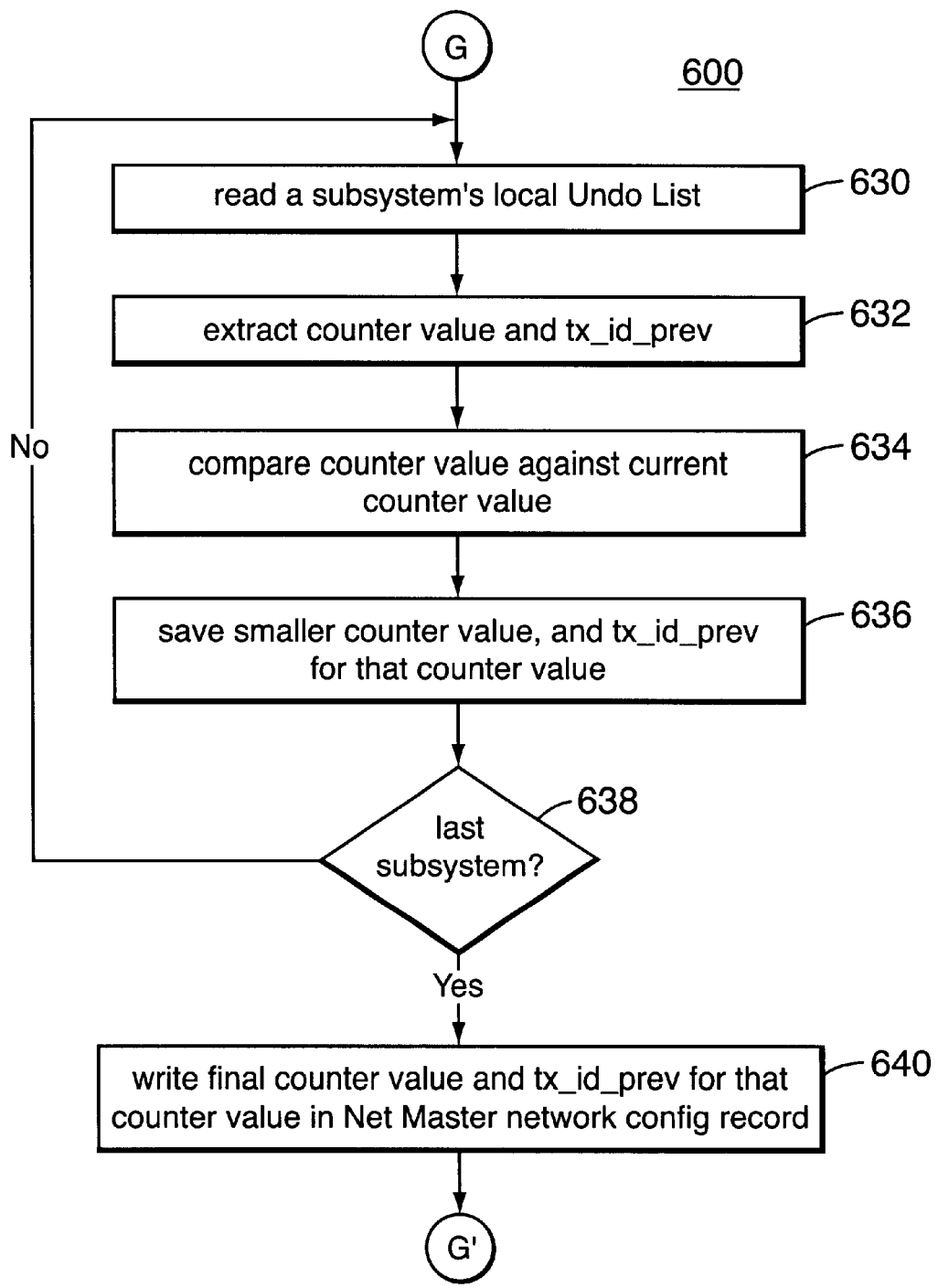

The Network Takeover Process performs these removals and FIG. 16 sets forth an overall conceptual view of the flow of FIG. 17A. A number of table operations are depicted and what follows is first a brief discussion of each one. FIGS. 17B–Q then set forth the details of the process; FIG. 16 only serves as a guide to the operations in those figures.

Referring FIG. 17A, the first step in the Network Takeover Process is to have the network master determine and store a common synchronization point. Recalling FIG. 15B, the earliest synchronization point in the first complete control point record was found for each backup system. This synchronization point, i.e., the sync counter and sync tx_id_prev, was stored in the Local Undo list for the backup system during the Local Undo Pass. The network master examines the Local Undo Lists for each backup system to determine a sync point that is common to all of the backup systems. FIG. 17B, detail G, sets for the steps for this operation.

Figure 17C:
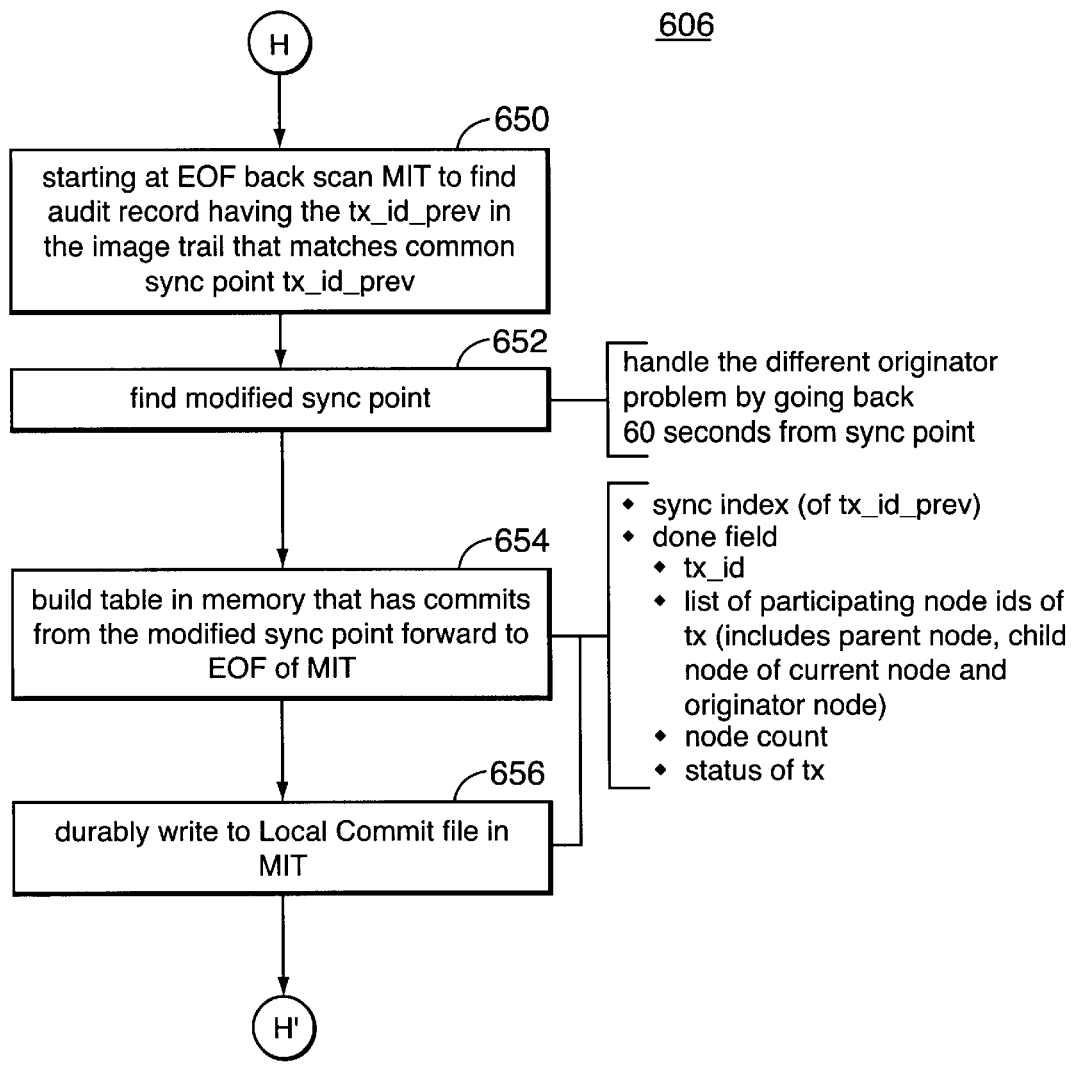
Figure 17D:
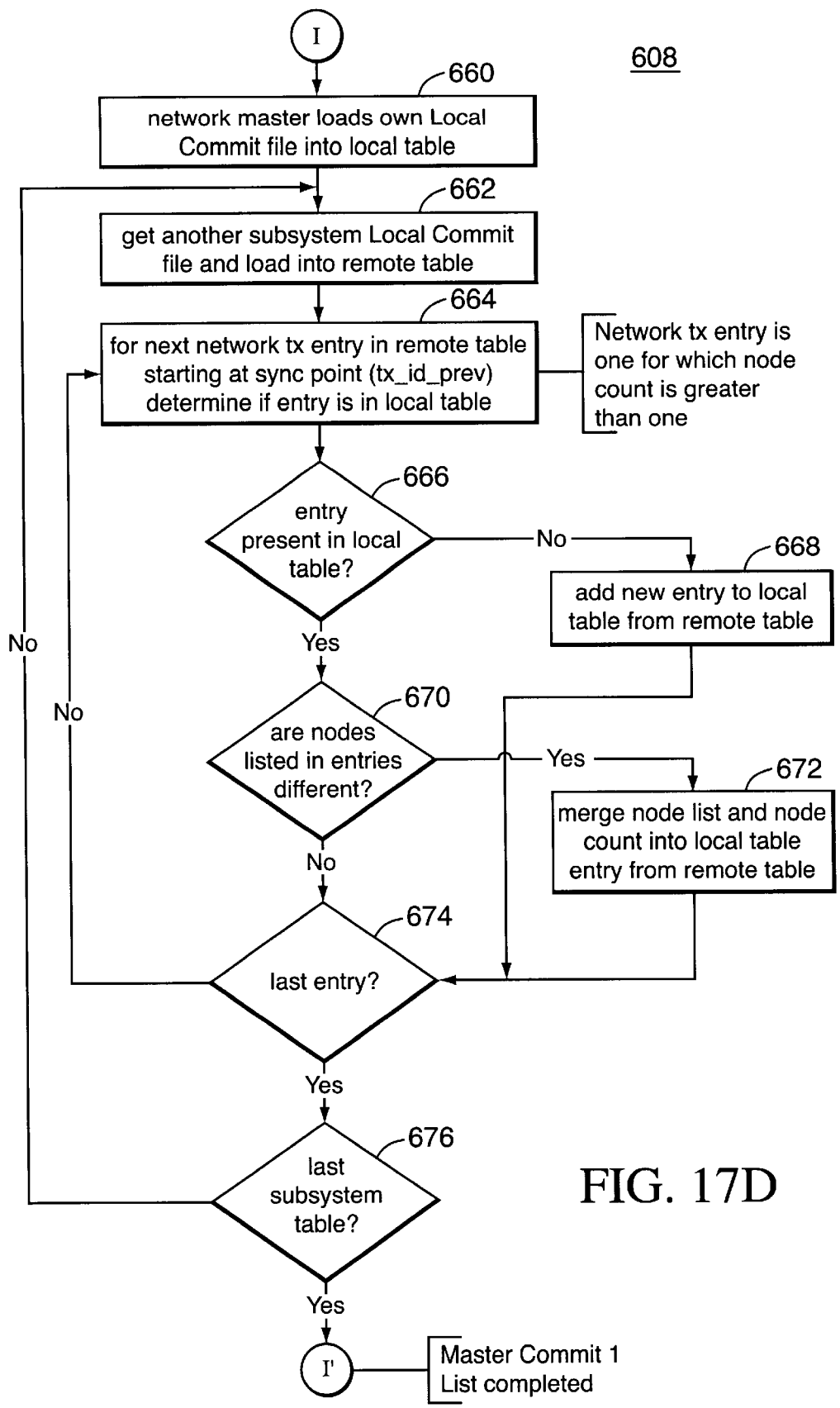
Figure 17E:
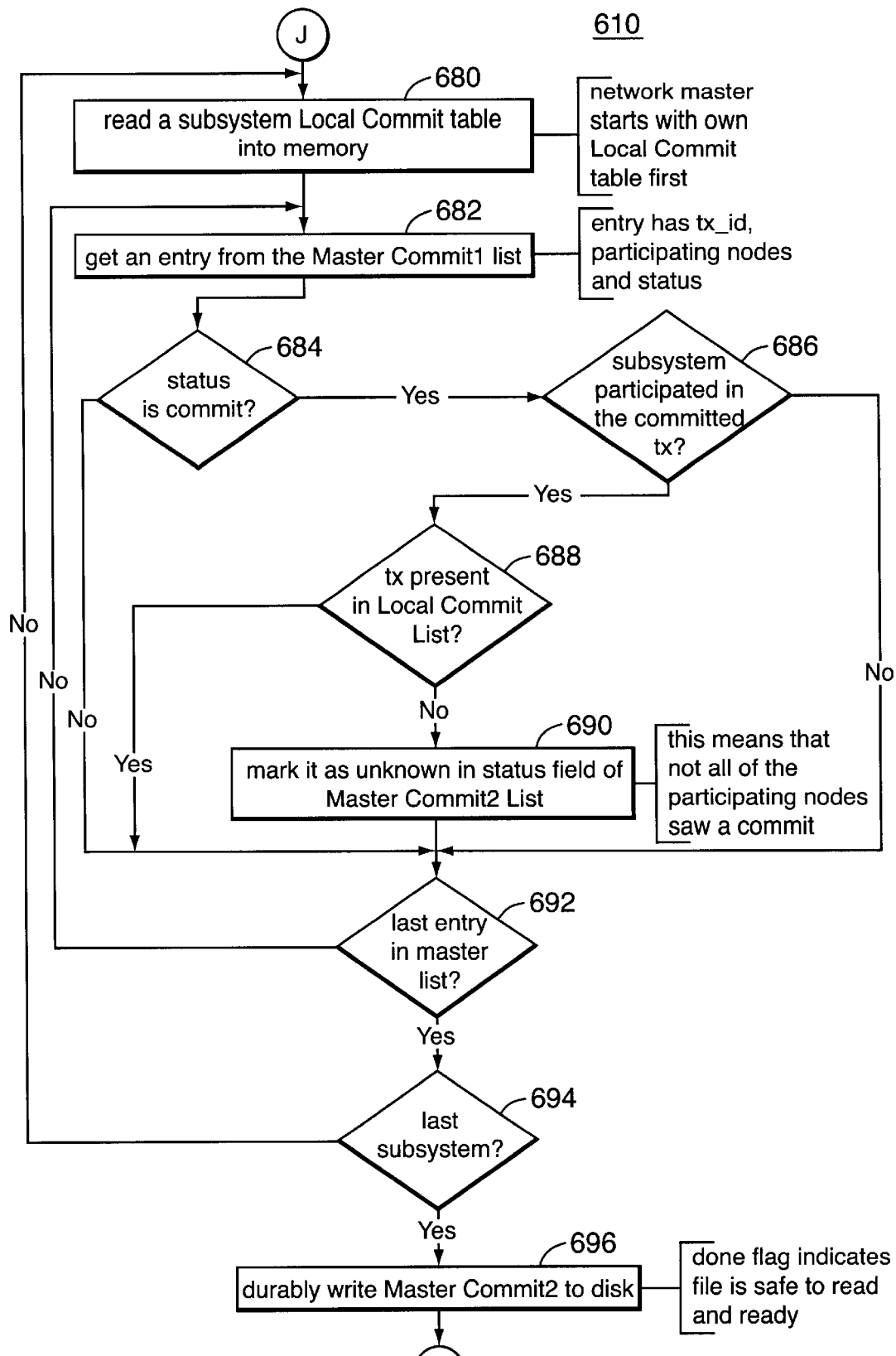

After the common sync point is determined, in step 600, each backup node discovers, by reading the Net Master Configuration Record, in step 602, that the common sync point is posted, in step 604, and proceeds to create, in step 606, a Local Commit List as set forth in FIG. 17C, detail H. A Local Commit list is a list of all committed transactions received by the backup system from a modified sync point forward. The sync point is modified to handle the "different originator" problem discussed below. Next, when the Local Commit lists are ready as determined in step 607, the master subsystem aggregates the Local Commit Lists, in step 608, to form a Master Commit1 list as shown in FIG. 17A and FIG. 16. The details of this operation are set forth in FIG. 17D, detail I. The result is that the Master Commit1 List contains a listing of all network transactions that were received by any backup node as committed and, for each transaction in the list, a list of nodes that participated in the transaction.

Again referring to FIG. 16 and FIG. 17A, the master subsystem next creates, in step 610, the Master Commit2 List from the Master Commit1 List and each of the Local Commit Lists. The details of the process are set forth in FIG. 17E, detail J. The result of this procedure is that the MasterCommit2 List contains a list of all transactions that committed on all of the participating nodes ("fully committed transactions") and all transactions that did not commit on all of the participating nodes ("partially committed transactions"). The latter are marked as unknown.

Figure 17F:
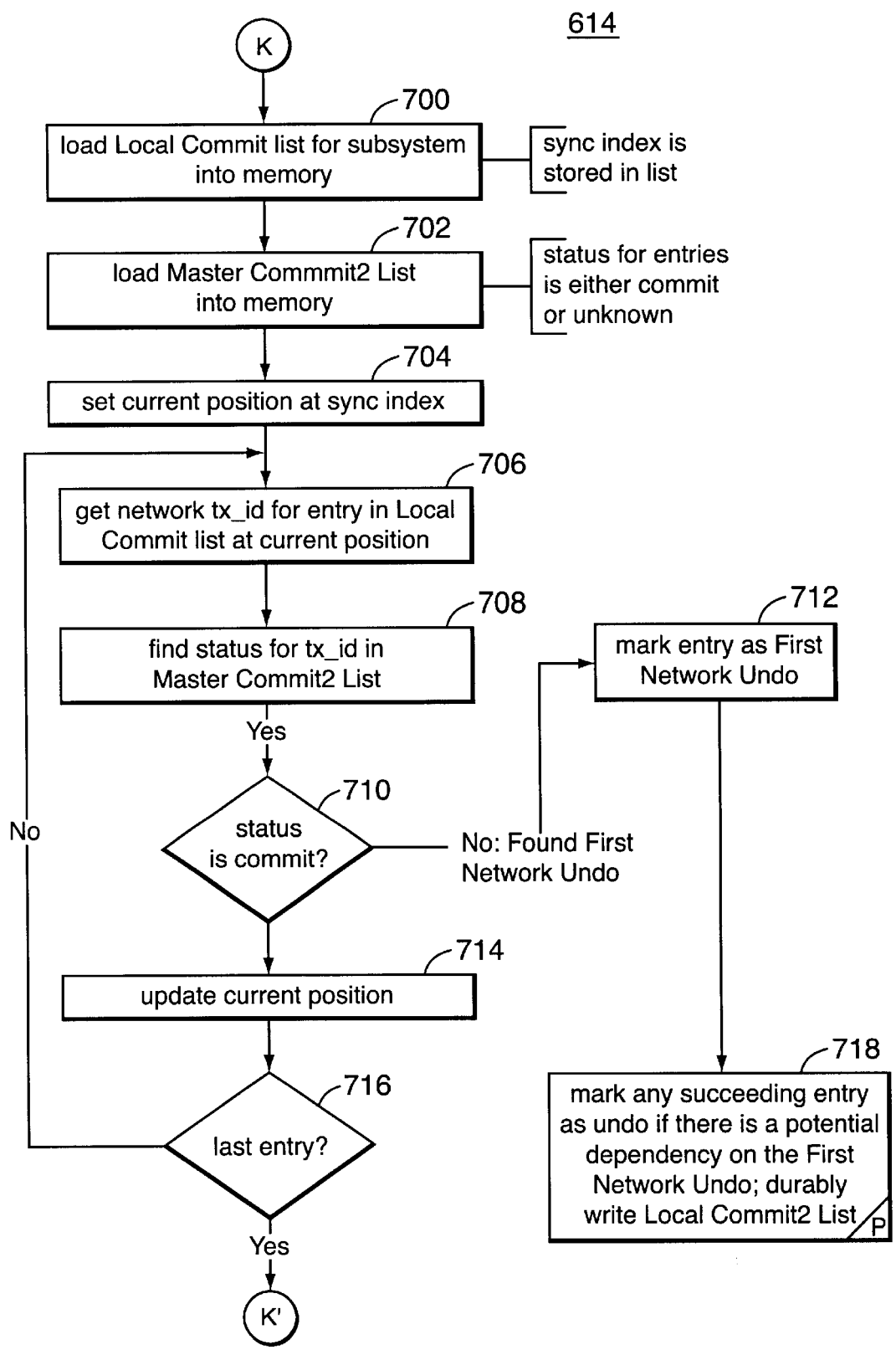

Next, in detail K, FIG. 17F, the Local Commit lists on each of the backup nodes must be corrected, in step 614, based on the Master Commit2 list when it is ready, as determined in step 612. Those transactions that did not commit on all of the participating nodes must be marked as undo from each Local Commit list if the node for that list participated in the transaction. Additionally, every committed transaction that potentially depends on a transaction that must be undone from the Local Commit list, must itself be undone. Details P and S set forth two alternatives for marking as undo potentially dependent committed transactions from each Local Commit list. The result of these steps is a Local Commit2 list for each node, which contains a list of every transaction that must be undone based on the Master Commit2 list and every transaction that must be undone because of potential dependencies on committed transactions that must be undone because the latter were not committed on all of the participating nodes.

Now each of these Local Commit2 lists, after they are all ready, as determined in step 616, must be compared against the Master Commit2 list, in step 618, to update that list with the additional potentially dependent transactions that must be undone. The procedure for this operation is set forth in detail L, FIG. 17G. The result is the Master Commit3 list, which contains all the transactions that must be undone to maintain network consistency of the backup systems, i.e., consistency across all backup systems whose primary nodes participated in the transactions.

Because the Master Commit3 list may contains new information not present in the Master Commit2 list, the Local Commit2 lists must be updated, in step 622, from the Master Commit2 list when it is available from the Network master as determined in step 620. The procedure for this update is set forth in detail M, FIG. 17H. The result is a finally updated Local Commit3 list, which is then converted, in step 622, to a Network Undo List for each subsystem, as shown in detail N, FIG. 17I.

After all of the list processing has finished, each subsystem performs the undo operations, in step 624, set forth in its Network Undo List and, when this is finished, the TakeOver_Completed Flag is set, in step 626, indicating the end of the second phase of the Takeover operation.

Determining a Common Sync Point (Detail G)

To determine a common sync point among the participating nodes to a distributed transaction, the network master first reads, in step 630, a subsystem's Local Undo List and extracts, in step 632, from it the sync counter value and tx_id_prev parameter. Next, in step 634, the counter is compared a current counter value, if there is one, and if the comparison shows that the subsystem's counter value is lower, then the smaller counter value and the tx_id_prev for that counter value are saved, in step 636. If subsystem from which the Local Undo List was obtained is not the last subsystem, in step 638, the process is repeated, each time saving a counter value and tx_id_prev if the counter value from the subsystem's Local Undo list is smaller, in step 636. After all of the subsystems have been checked, the final counter value and tx_id_prev for that counter value are stored, in step 640, in the Net Master Network Configuration Record. The counter value that is stored is the one which is the smallest of all of the subsystems examined by the Network Master. All of the subsystems have the transaction whose counter value is the smallest value found by this process. However, the synchronization point is taken to be the tx_id_prev recorded with that counter value because using the tx_id_prev guarantees that the common synchronization point is a committed sync transaction.

To illustrate, if an update U1 of the special synchronization file's record occurs, followed by an undo of that update B1, the audit trail has an update record for the U1 update, with before and after images of the synchronization file's record, and an update record for the undo operation B1, with before and after images of the synchronization file's record. Let the before and after images of U1 be {counter=10, tx_id_prev=T9, tx_id_current=T10 } and {11, T10, T11}, respectively, which indicates that T11 was the last sync transaction. The before and after images of B1 are {11, T10, T11 } and {10, T9, T10}, which indicates that T11 was undone; B1 has an abort flag set as true in the record. This causes B1 to be ignored in detail C, FIG. 15C, the last update of tx_id_prev, from the after image of U1, is set to T10, which is guaranteed to be a committed transaction.

Subsystem Creates Local Commit List (Detail H)

FIG. 17C, detail H, sets forth the procedure for creating a Local Commit List. Referring first to FIG. 17A, the subsystems wait, in step 604, for the network master to write the common sync point to the Net Master configuration Record. When it is discovered that a common sync point and tx_id_prev have been posted to the record, each subsystem proceeds to form, in step 606, its Local Commit List, based on the common sync point. Referring now to FIG. 17C, each subsystem starts, in step 650, at the EOF of its MIT to find the audit record having the tx_id_prev in the image trail that matches the common sync point tx_id_prev. Having found this tx_id_prev, the subsystem then moves back farther in the MIT, in step 652, by going back about 60 seconds, in one embodiment, from the tx_id_prev sync point to create the modified common sync point to handle the case in which there are multiple transaction originators. This case causes the commit sequences of transactions to vary among the various nodes that participate in the transactions. For example, if the originator of transaction T1, is node A, and the originator of transaction T2 is node B, and both T1 and T2 involve both nodes and T2 and T1 commit at about the same time, then the commit sequence on node A is T1, T2, whereas the commit sequence on node B is T2, T1. Similarly, near the common synchronization point in a backup system, determined in detail G, there may be transactions that must be considered in the process that are on either side of the synchronization point because they had different originators. Going back farther in time guarantees that regardless of the originator of the transaction all transactions "around" the sync point will be processed. It is preferred to go back about 60 seconds to be safe, but in some embodiments a smaller time is acceptable. Next, in step 654, a table is built in memory that has the commits in the MIT from the modified common sync point forward to EOF of the MIT. The table that is built is the Local Commit List which contains the tx_id for local and network transactions, with a list of participating node ids and a node count for network transactions, the status of the transaction, along with the sync index (tx_id_prev) and a done field in the header of the Local Commit List. The participating node ids include those nodes that are known to the transaction monitor (TM) of the primary node associated with the backup node. In one embodiment, the participating nodes known to the transaction monitor are the parent node and child node of the current node and the originating node. This information is used later to construct a complete list of all of the participating nodes. The Local Commit List is then durably written, in step 656, to the MIT. A done flag is set in the done field so that the Local Commit List can be read only after it has been fully written to disk.

Master Creates Master Commit1 List (Detail I)

FIG. 17D, Detail I, sets for the procedure for forming the Master Commit1 List. First, in step 660, the network master loads its own Local Commit file into a local table. Next, in step 662, the network master reads another subsystem's Local Commit List and loads it into a remote table. Having these two Local Commit tables, the network master proceeds to examine, in step 664, the next network entry in the remote table starting at the common sync point (tx_id_prev) to determine if the entry is in the local table. A network entry is an entry for which the node count is greater than one indicating that more than one node participated in the transaction. If the entry is not present in the local table, as determined in step 666, then the entry is added, in step 668, to the local table from the remote table. If the entry is present in the local table as determined in step 666, the list of nodes is examined to determine, in step 670, whether the list for the local table is different from the list for the remote table. If so, the node list and node count from the remote table are merged, in step 672, into the local table. This process continues until the last entry of the remote table is examined, as determined in step 674. Then another subsystem's Local Commit table is loaded, in step 662, and the process examines each entry of that table, updating the local table in the process. When the last subsystem table has been completely examined as determined in step 676, the local table is now the Master Commit1 List which contains all network transactions received as committed and their node lists and node counts.

Forming Master Commit2 List (Detail J)

In this procedure a comparison is made between each subsystem's Local Commit table and the Master Commit1 List that was just formed by the master. The comparison determines the "differences" between the entries in the Local Commit table and the Master Commit1 List, where "differences" means that the Master Commit1 List has a transaction marked committed but the Local Commit table for a particular subsystem that participated in the transaction does not have a commit for the transaction. First, in step 680, a subsystem's Local Commit table is read into the master's memory and then an entry from the Master Commit1 List is obtained, in step 682. If the status of the entry in the Master Commit1 list is not a commit as determined in step 684, the entry is ignored and the next entry is obtained, in step 682. If the status of the entry is commit, as determined in step 686, then the node list is checked to determine, in step 686, if the particular subsystem whose Local Commit list is under review, participated in the transaction. If not, the Master Commit1 List entry is ignored and the next entry is fetched. If the subsystem participated in the committed transaction, as determined in step 686, then the transaction is looked up in the Local Commit list, in step 688. If the transaction is present in the list, then the next entry from the Master Commit List is obtained, in step 682 after testing for the last entry in step 692. However, if the entry is not found, as determined in step 688, then the subsystem participated in the transaction but did not receive a commit. Therefore, this transaction cannot be kept as a committed transaction in any backup system. The network master marks its entry in the Master Commit2 List as unknown, in step 690, and proceeds to examine, in the same way, the next entry in the Master Commit2 List, as determined in step 692. The result is that additional committed transactions are marked as unknown because commits for those transactions are not found in all of the participating nodes. Therefore, they cannot be left as committed on any of the participating nodes. After the last subsystem's Local Commit List has been examined, as determined in step 694, the Master Commit2 list is durably written to disk, in step 696, and the done flag is set indicating the file is safe to read and ready.

Subsystem Creates Local Commit2 List (Detail K)

Now that the Master Commit2 List has marked what were committed transactions as unknown because at least one participating node did not receive a commit for the transaction, this information must be shared with the Local Commit Lists in the subsystems. FIG. 17F sets forth the procedure for updating the Local Commit Lists, which changes those lists to Local Commit2 Lists. This procedure occurs approximately concurrently at each of the subsystems. First, in step 700, a subsystem loads its own Local Commit List into memory and then loads, in step 702, the newly formed Master Commit2 List into memory. A current position for scanning is set, in step 704, at the sync index, and the network tx_id for an entry in the Local Commit list is obtained, in step 706, and checked, in step 708, for its status in the Master Commit2 List. If the Master Commit2 List says the entry is Commit, as determined in step 710, then the entry can stay as committed in the Local Commit List and the next entry in the Local Commit List can be tested, in step 706, after updating the current position, in step 714, and testing for the last entry, in step 716. This means that the entry in the Local Commit List was safe to keep because every participating node received a commit for the transaction. If however, the entry in the Local Commit table has commit status, as determined in step 710, but the entry in the Master Commit2 List has unknown status, then there is a problem. The Local Commit list cannot keep the status of the entry as committed but instead must mark it as undo, in step 712. The first occurrence of this for a Local Commit list is labeled the First Network Undo and is an important event because it triggers additional processing of the Local Commit List. The key problem here is that if a committed transaction must be undone, there may have been other later transactions that depended on that committed transaction because it was a committed transaction. These potential dependent transactions cannot be kept in the Local Commit list unless it can be proved that they were not dependent on the First Network Undo in the Local Commit List. Therefore, any succeeding entry that is potentially dependent on the First Network Undo is marked as undo in the Local Commit List as well, in effect causing a forward cascade of undos in the Local Commit List after the First Network Undo occurs. Alternative Details P and S, discussed below, sets for the details of determining dependent transactions. After all entries in the Local Commit table have been examined against the Master Commit2 List, in step 718, the procedure ends at each of the subsystems and the Local Commit2 List is durable written.

Forming the Master Commit3 List (Detail L)

Figure 17G:
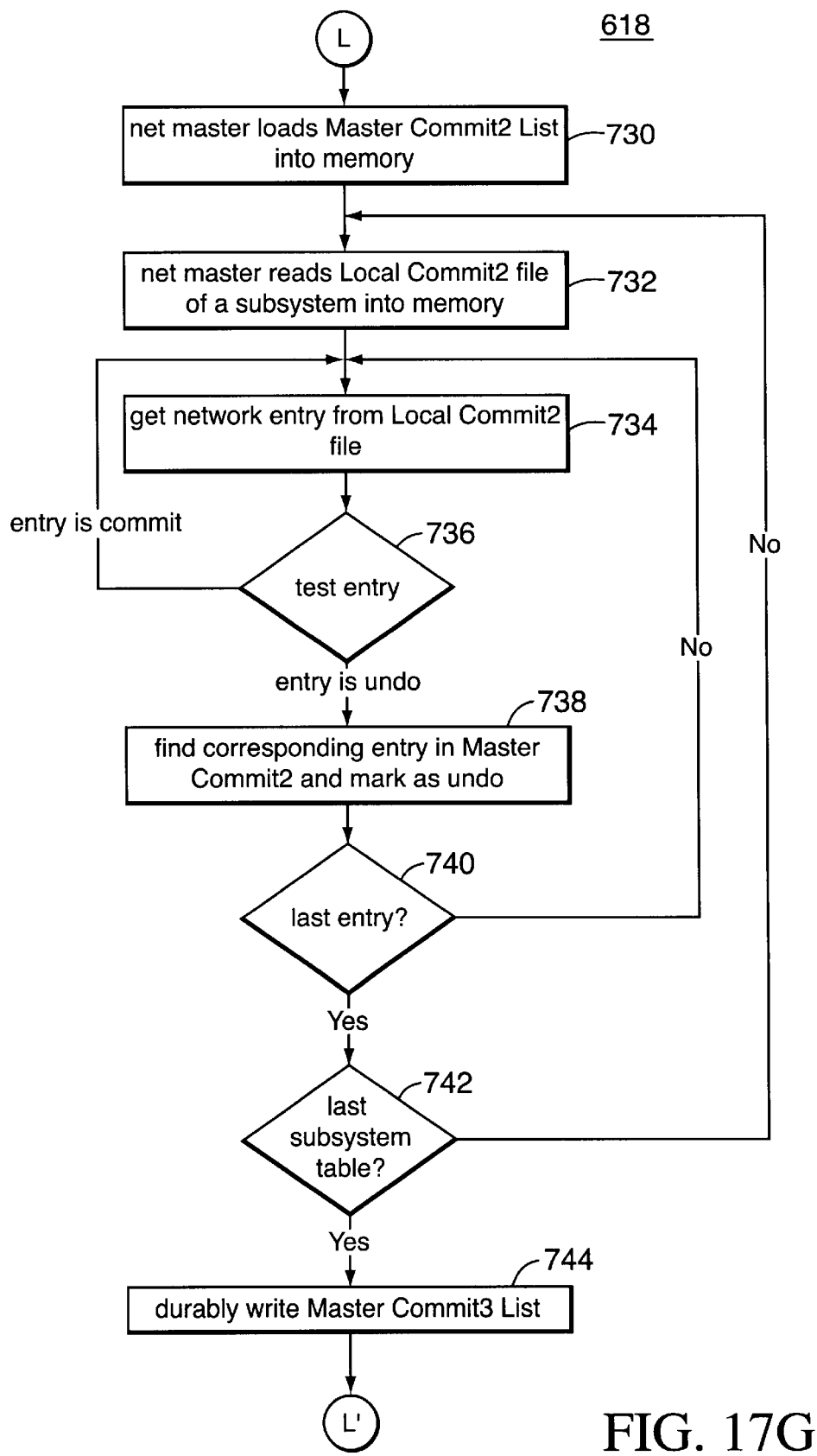
Figure 17H:
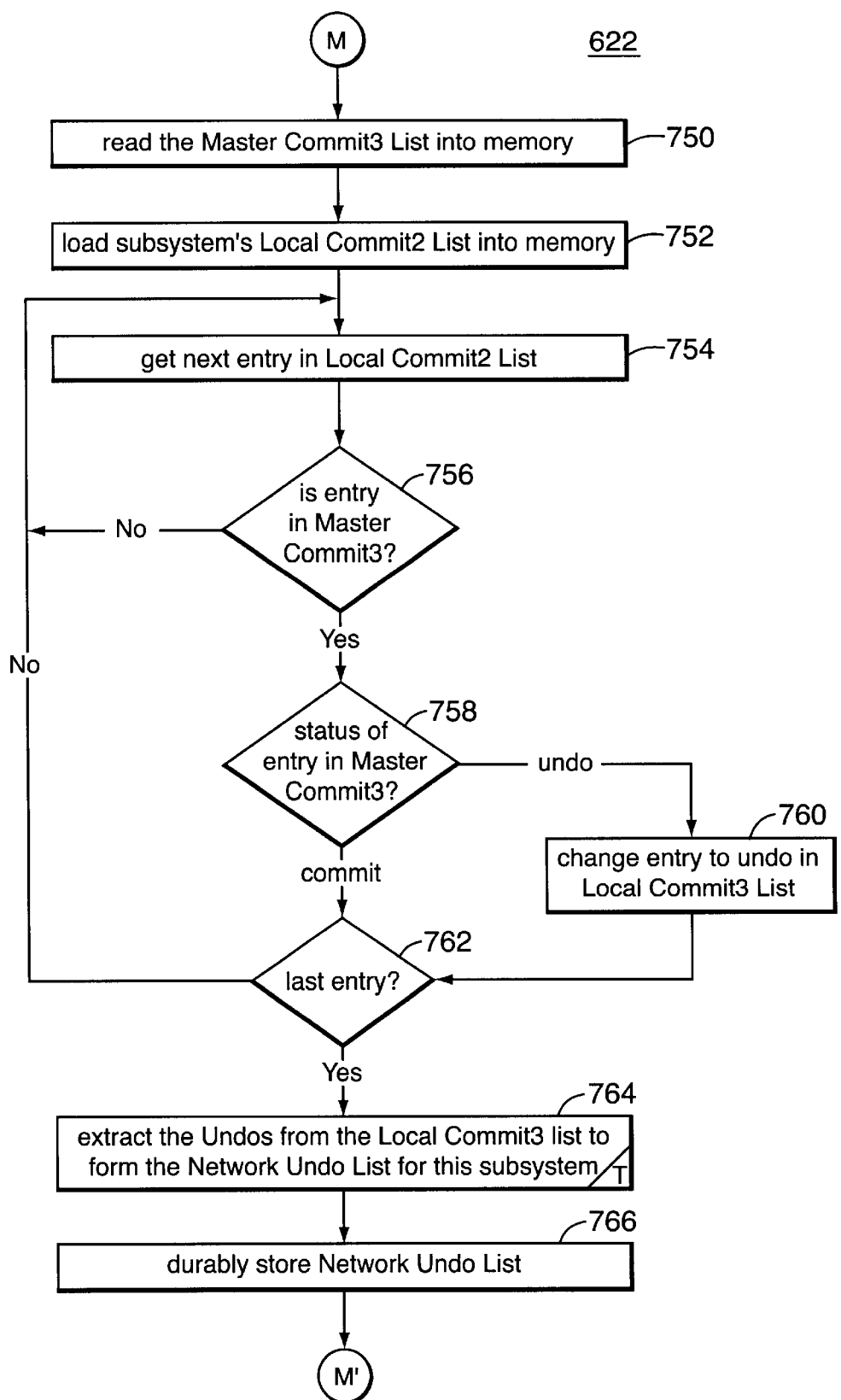
Figure 17I:
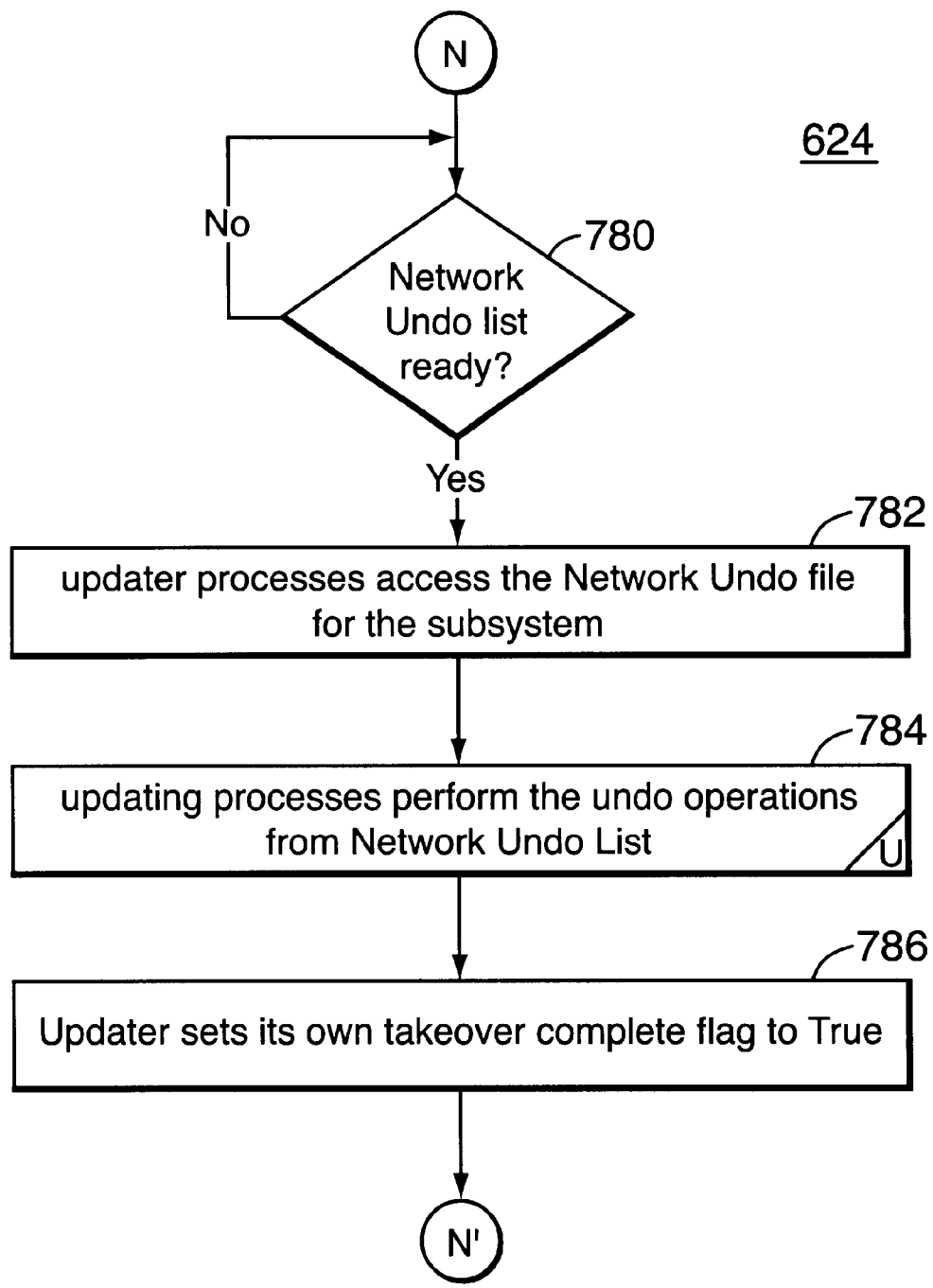

FIG. 17G, detail L, sets for the procedure for forming the Master Commit3 List which starts after all of the Local Commit2 Lists have been durably written by each subsystem. (See FIG. 17A). This step is required because potentially dependent transactions that were marked as undo from one Local Commit2 List may have to be marked as undo in other Local Commit2 Lists to maintain consistency. In effect the forward cascade of undos at each subsystem must be allowed to propagate through all of the other subsystems. The network master performs part of this forward cascade by first reading the Master Commit2 List into memory, in step 730, and then a particular Local Commit2 List into memory, in step 732. Starting at the sync index (tx_id_prev), a network entry from the Local Commit2 list is obtained, in step 734, and if the entry is marked commit, as determined in step 736, the next entry is fetched, in step 734. If the entry is marked undo, as determined in step 736, then the corresponding entry in the Master Commit2 List is found and marked as undo, in step 738. If there are more entries, as determined in step 740, the net master reads another entry from the Local Commit2 file, in step 734. This processing continues with each Local Commit2 List as determined in step 742. The result is the Master Commit3 List which is then durably written to disk, in step 744.

Forming the Local Commit3 Lists (Detail M)

Because there are now possibly additional undos in the Master Commit3 List, these must be propagated to all of the Local Commit2 Lists, thus completing the forward cascade of undos. Each subsystem, approximately concurrently, reads into memory, in step 750, the Master Commit3 List when it is ready and, in step 752, its own Local Commit2

List. Starting at the modified common sync point, an entry in the Local Commit2 list is obtained, in step 754, and if it is in the Master Commit3 list, as determined in step 756, the status of the entry in the Master Commit3 list is tested, in step 758. If the entry is commit, then the transaction can be safely kept. If the status of the entry in the Master Commit3 list is undo, as determined in step 758, then the entry in the Local Commit2 List must be changed to undo, in step 760, the Local Commit2 List becoming the Local Commit3 list. This processing continues for each entry, as determined in step 762, in the Local Commit2 list. The result, the Local Commit3 List, thus contains all the transactions safe to keep and ones that must be undone.

Next, the Network Undo List is formed, in step 764, from the Local Commit3 List. FIG. 17N, detail T, sets forth this procedure. The Network Undo List is then durably stored, in step 766.

Subsystem Performs Undo of Network Transactions (Detail N)

When each Network Undo List is ready, as determined in step 780, the Updater processes, in each subsystem, access, in step 782, the Network Undo File and perform the undo operations specified in the List, in step 784. The procedure for performing the undos is set forth in FIG. 17P, detail U. When each Updater in a given subsystem has completed its work, the Updater sets its takeover complete flag to true, in step 786. When the Receiver of a backup node detects that the takeover complete flag of each Updater in that backup node is true, it sets the TakeOver_Completed Flag, in step 626 of FIG. 17A, thereby indicating the end of the Network Takeover Process for that node. The backup systems have thus been restored to a fully consistent state and can perform transaction processing seamlessly in place of the nodes of the primary system until the failing primary system node or nodes are brought back on line.

Marking as Undo Dependent Entries in the Local Commit2 List (Detail P, Q, and R)

Figure 17J:
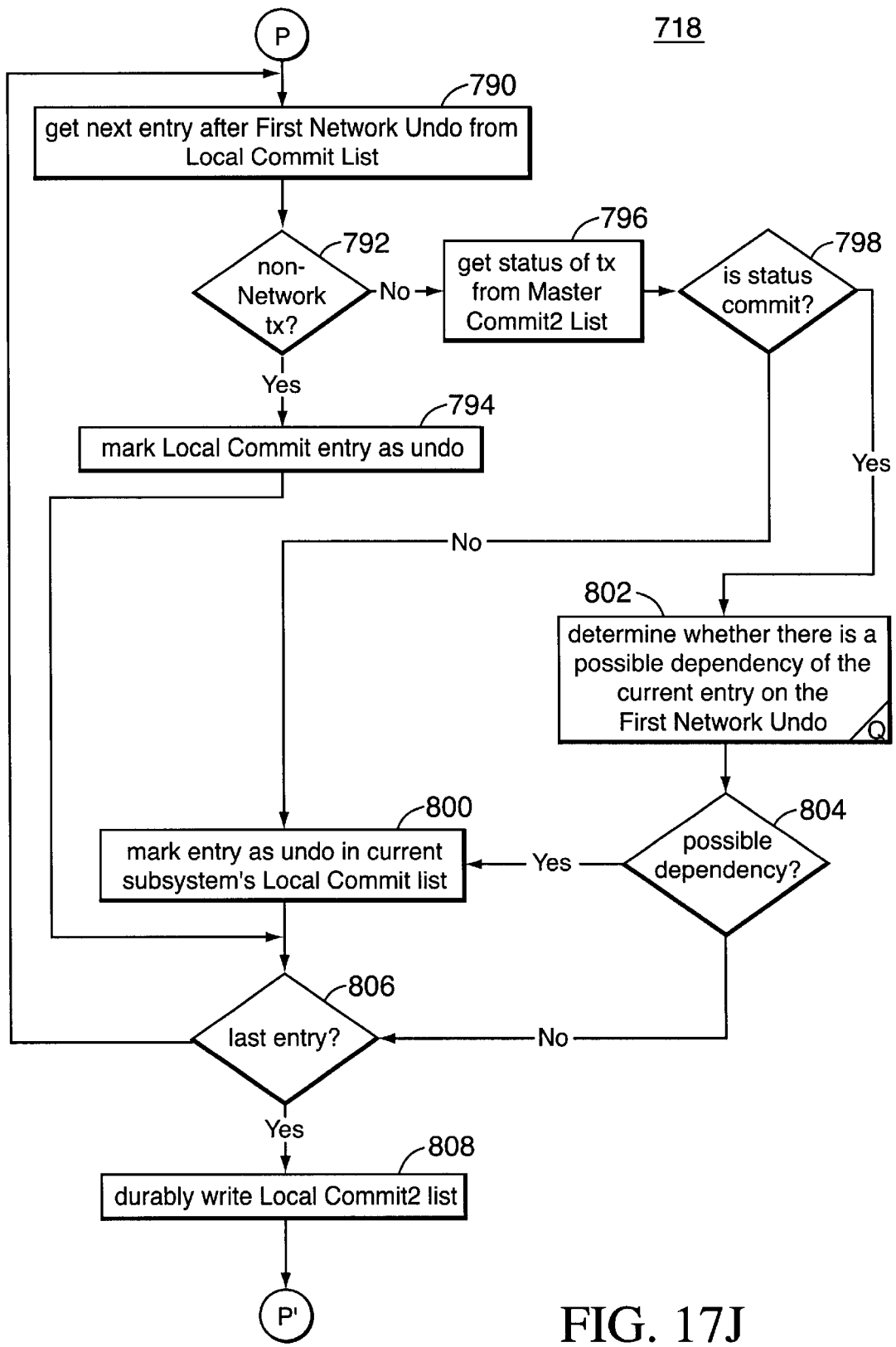
Figure 17K:
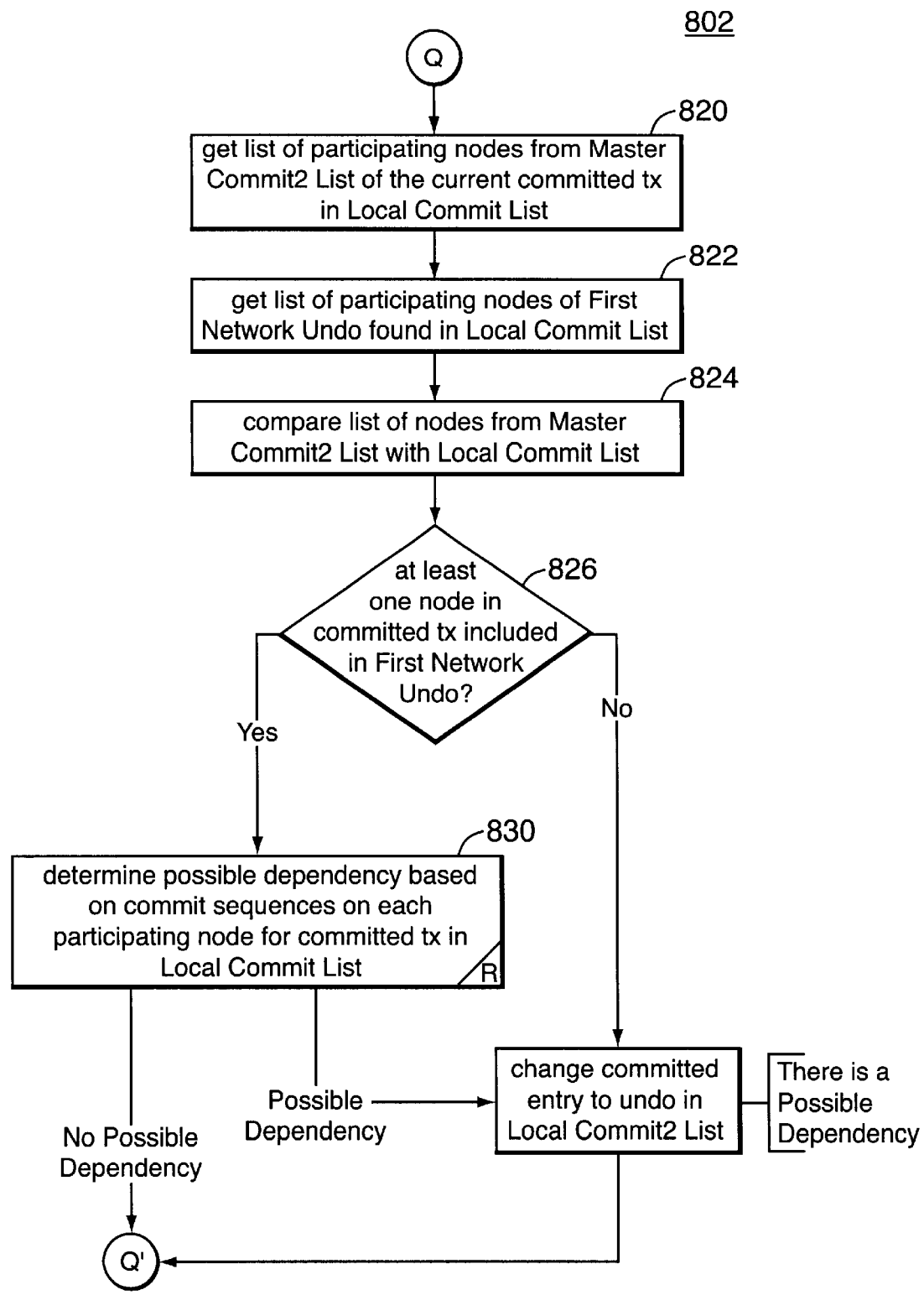
Figure 17L:
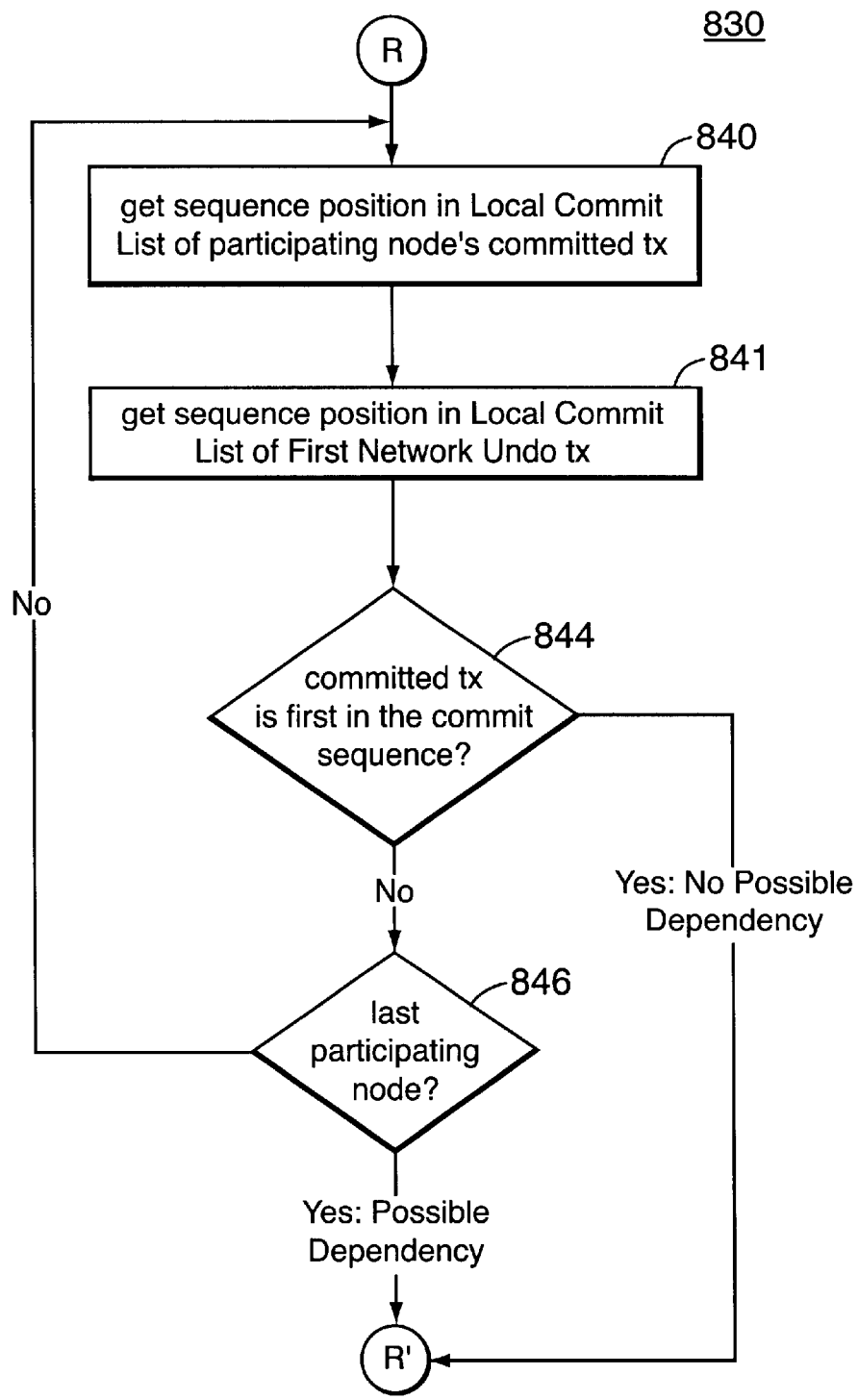

FIGS. 17J, 17K and 17L, set forth a procedure, briefly described in connection with FIG. 17F, detail K, for marking as undo potential dependencies from the Local Commit2 List once the First Network Undo has been found in the Local Commit2 List. The rule is that any transaction can only be kept if it can be proven that it is not dependent on the First Network Undo. Otherwise, it must be marked as undo. If a committed transaction that is subsequent to the First Network Undo, is committed on at least one participating node before the First Network Undo was committed then there cannot be a dependency between the committed transaction and the First Network Undo. The reason is that record or table locking protocol of the Transaction Monitors would not have permitted such a situation for dependent transactions.

Referring now to FIG. 17J, detail P, the next entry in the Local Commit List after the First Network Undo is obtained, in step 790, and if it is a non-network transaction, as determined in step 792, it is marked as undo, in step 794, because it may be potentially dependent on the First Network Undo and there is no way to determine otherwise. If the next entry is a network transaction, as determined in step 792, then the status of the transaction is fetched, in step 796, from the Master Commit2 List and if the status is not commit, as determined in step 798, it is marked undo, in step 800, because all undos marked in the Master Commit2 List must be propagated, if they pertain, to the Local Commit List for each subsystem. If the next entry is marked as commit in the Master Commit2 List, as determined in step 798, then a dependency determination must be made, in step 802, which is set forth in FIG. 17K, detail Q. If there is a possible dependency, as determined in step 804, then the entry is marked as undo in the current system's Local Commit List, in step 800. If there is no possible dependency, then, if there are no more entries in the Local Commit list to check, as determined in step 806, the Local Commit2 is durably written to disk in step 808.

Potential Dependency Determination (Detail Q)

To determine whether there is a potential dependency, the Master Commit2 List is consulted, in step 820, to find the list of nodes that participated in the committed transaction in question in the Local Commit List. Next, in step 822, the list of participating nodes for the First Network Undo is obtained from the Local Commit List. The lists of participating nodes from each source are compared, in step 824, to determine, in step 826, whether there is at least one node in the committed transaction from the Master Commit2 List included in the nodes that participated in the First Network Undo. If there is no node in common, as determined in step 826, then the potential dependency cannot be eliminated, and the committed transaction in question is marked undo, in step 828, in the Local Commit List, which then becomes the Local Commit2 List. If there is at least one node in common between the two lists of participating nodes, as determined in step 826, then, in theory, it is possible that a lack of dependency may be proven. If it is determined, in step 830, that there is a possible dependency, as detailed in FIG. L, detail R, then the entry is marked undo in the Local Commit2 List. If it is proved that there is no possible dependency, then the entry is left unchanged, as a commit.

Determining possible Dependency Based on Commit Sequences (Detail R)

In FIG. 17L, detail R, the participating node's sequence position for the committed transaction in question, is obtained, in step 840, preferably from the Local Commit List of that participating node. In step 841, the sequence position for the First Network Undo transaction is obtained preferably from the Local Commit List. If, as determined in step 844, the committed transaction in question was first in the sequence of commits at the participating node (recall that it is second in the node whose Local Commit List committed entry is being tested), then there can be no possible dependency and the test is completed. If, however, as determined in step 844, the committed transaction in question occurred second in the participating node's commit sequence, then whether the committed transaction can be kept is still unanswered. If there are no more participating nodes, as determined in step 846, then there is a possible dependency because dependency has not been ruled out. If there are more participating nodes, as determined in step 846, then it is possible that one of them has a commit sequence with the committed transaction in question listed before the First Network Undo transaction. If so, the potential dependency can be ruled out. Thus, the flow in FIG. 17L continues to check each participating node, if more than one, for its commit sequence. If the potential dependency has not been ruled out after all participating nodes have been tested, as determined in step 846, then it is assumed there is a potential dependency and the committed transaction in question is marked undo.

Marking as Undo Dependent Entries in the Local Commit2 List (Detail S)

Figure 17M:
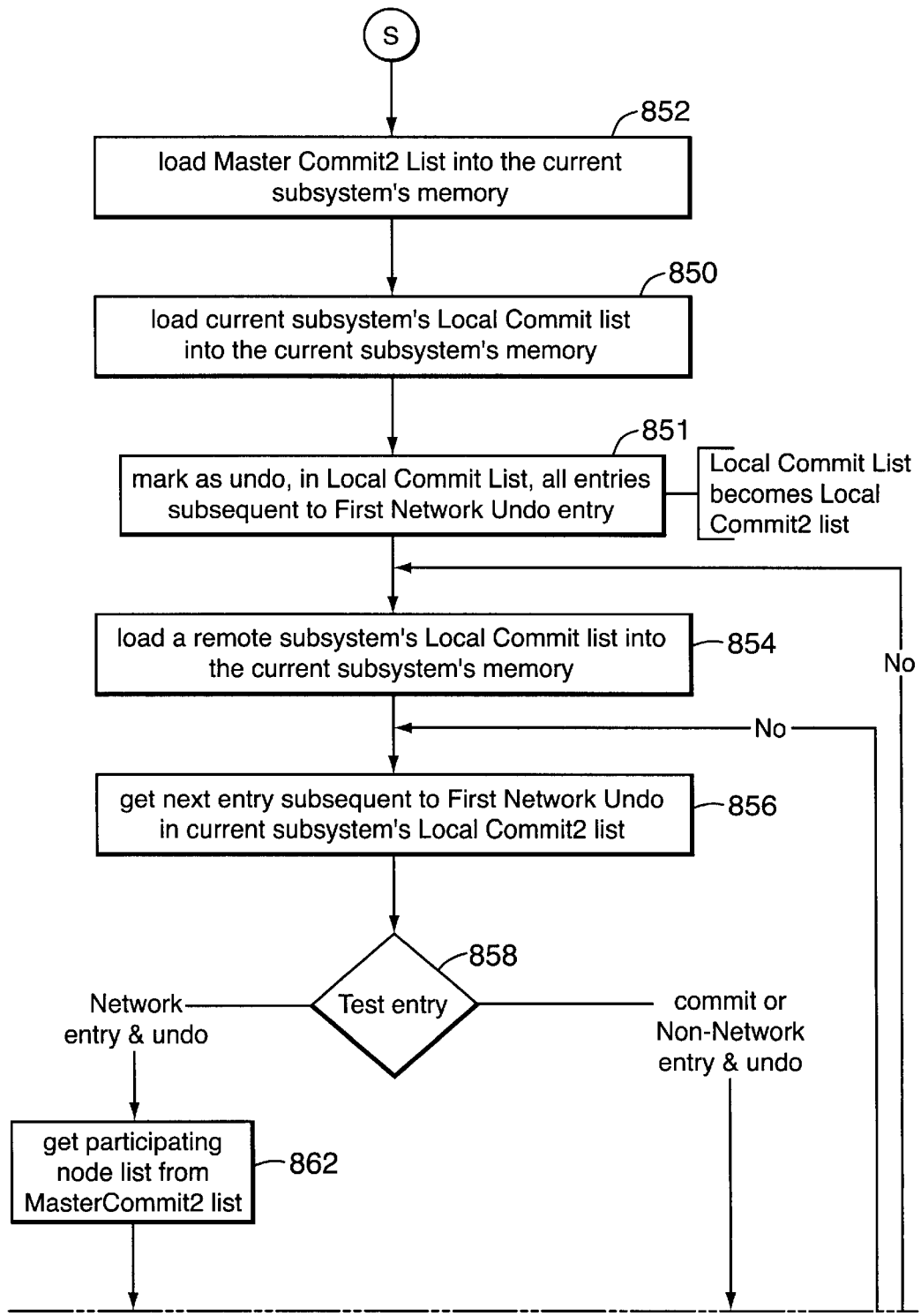
Figure 17M:
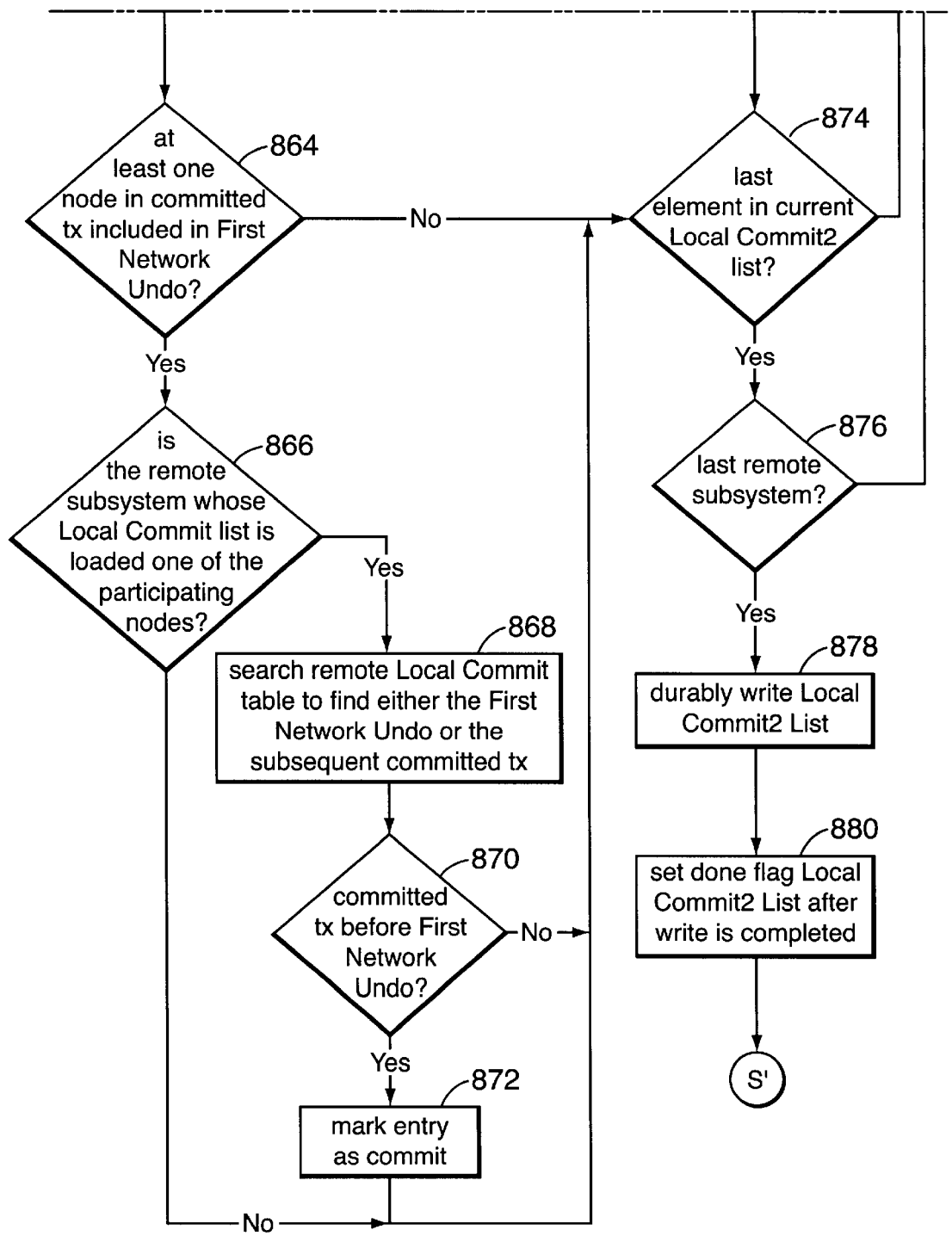
Figure 17N:
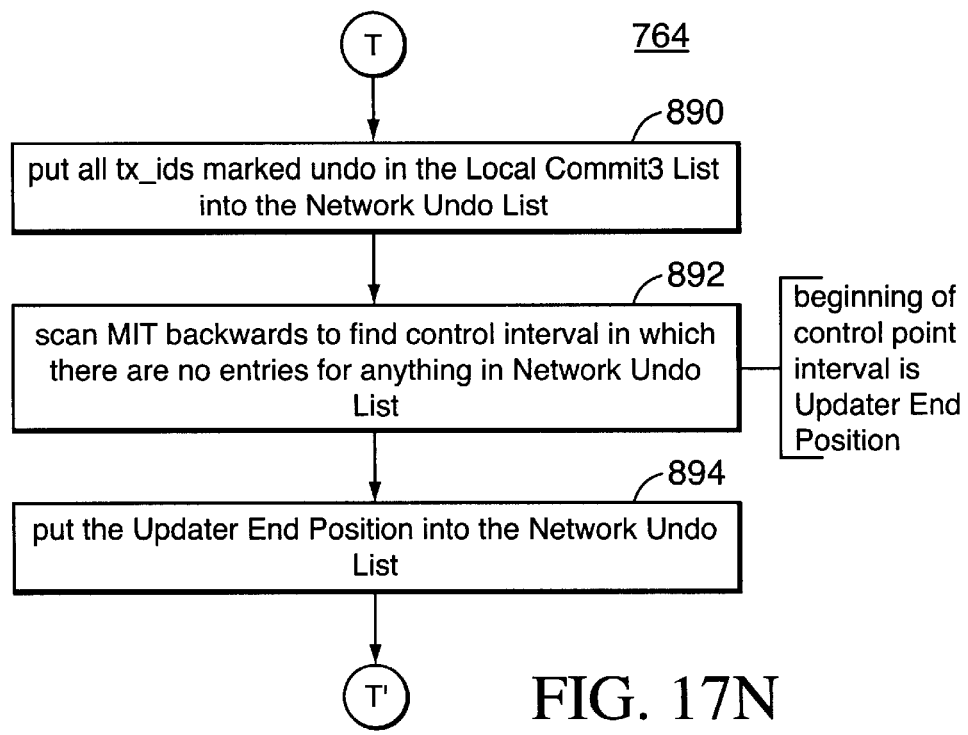

FIG. 17M, detail S, sets forth an alternative procedure for determining potential dependencies and marking them as undo in the Local Commit2 list. In the procedure set forth in FIG. 17J, detail P, other local subsystems' Local Commit List must be repeatedly checked for each committed entry in the Local Commit List of a "current subsystem." This is a time-consuming procedure. The alternative procedure, set forth in FIG. 17M, instead obtains an entire Local Commit List of a system other ("a remote subsystem") than the one with the First Network Undo. Thus, the current subsystem operates on three tables, the Master Commit2 List obtained in step 852, the current subsystem's Local Commit list that has the First Network Undo obtained in step 850, and another Local Commit List from a remote subsystem obtained in step 854. Each entry in the current subsystem's Local Commit List subsequent to the First Network Undo entry is marked as undo in step 851. The next entry subsequent to the First Network Undo in the current subsystem's Local Commit2 list is obtained, in step 856, and a test is performed in step 858. If the entry is a non-network entry (it has only one participating node) and is marked undo or the entry is marked commit, then the next entry in the Local Commit List is obtained, in step 856, after testing, in step 874, whether it is the last element in the current Local Commit2 list. If the entry is a network entry (it has more than one participating node) marked as undo, as determined in step 858, then the Master Commit2 List is consulted, in step 862, for a list of participating nodes for the transaction. If there is at least one other node that participated both in the First Network Undo and the committed transaction in question, as determined in step 864, then if the remote Local Commit List is for one of the participating nodes, as determined in step 866, that Local Commit List is searched, in step 868, to find either the First Network Undo transaction or the subsequent committed transaction in question. If the committed transaction in question is found listed prior to the First Network Undo transaction, as determined in step 870, the entry is marked as commit, in step 872, because no dependency is possible. If the committed transaction in question is found listed subsequent to the First Network Undo, as determined in step 870, then the entry stays as undo. After all entries of the Local Commit table have been examined, as determined in step 874, then next remote subsystem Local Commit list is obtained, in step 876, and the procedure repeated. After all remote subsystem's Local Commit lists have been examined, the Local Commit2 list is durably written in step 878, preserving the header of the LocalCommit List in the LocalCommit2 List. The done flag is set in the Local Commit2 List after the write is completed in step 880. Because only committed network entries need to be checked, as more committed entries are marked as undo, the processing time at each subsystem diminishes as the number of remote subsystems increases. Also, because the remote subsystem table is fetched and loaded locally, scanning time of the table is very quick. The result is a large reduction in processing time to make the potential dependency evaluation.

Extracting the Undos to Form the Network Undo List (Detail T)

FIG. 17N, detail T, sets forth the procedure for extracting the Undos from the Local Commit3 List to form the Network Undo List. First all transactions marked as undo in the Local Commit3 List are copied, in step 890, to the Network Undo List. Next, the MIT is scanned backwards, in step 892, to find the control interval in which there are no entries in the MIT that related to anything in the Network Undo List. This point is the Updater End Position which is then placed, in step 894, into the Network Undo List.

Updaters Perform the Undo Operations from the Network Undo List (Detail U)

Figure 17P:
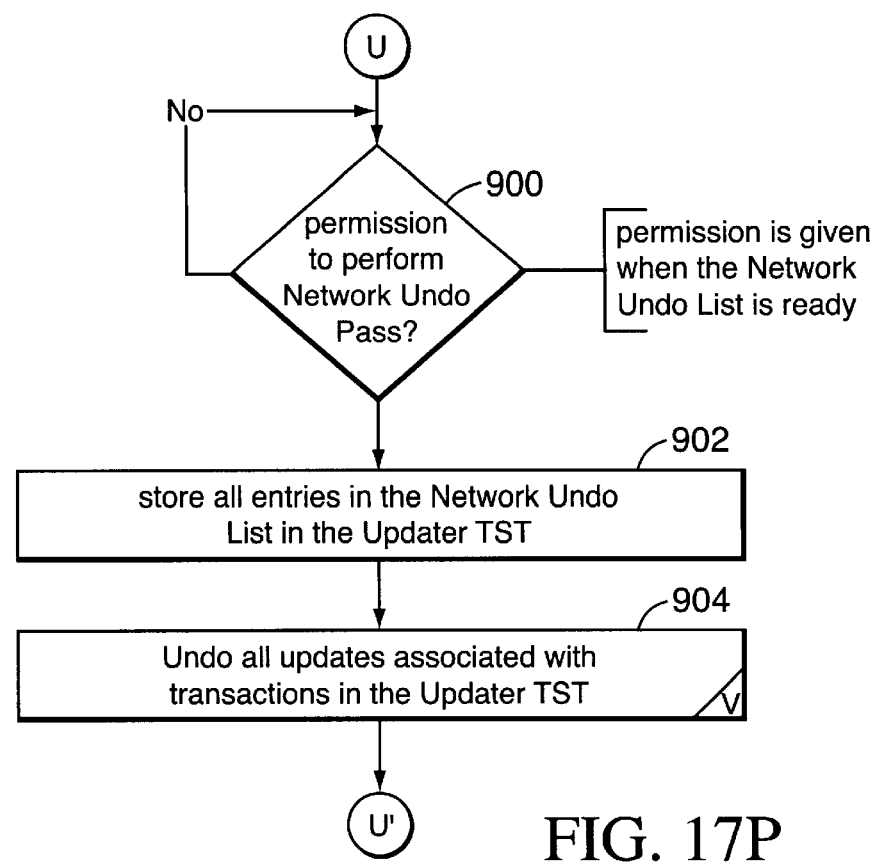
Figure 17Q:
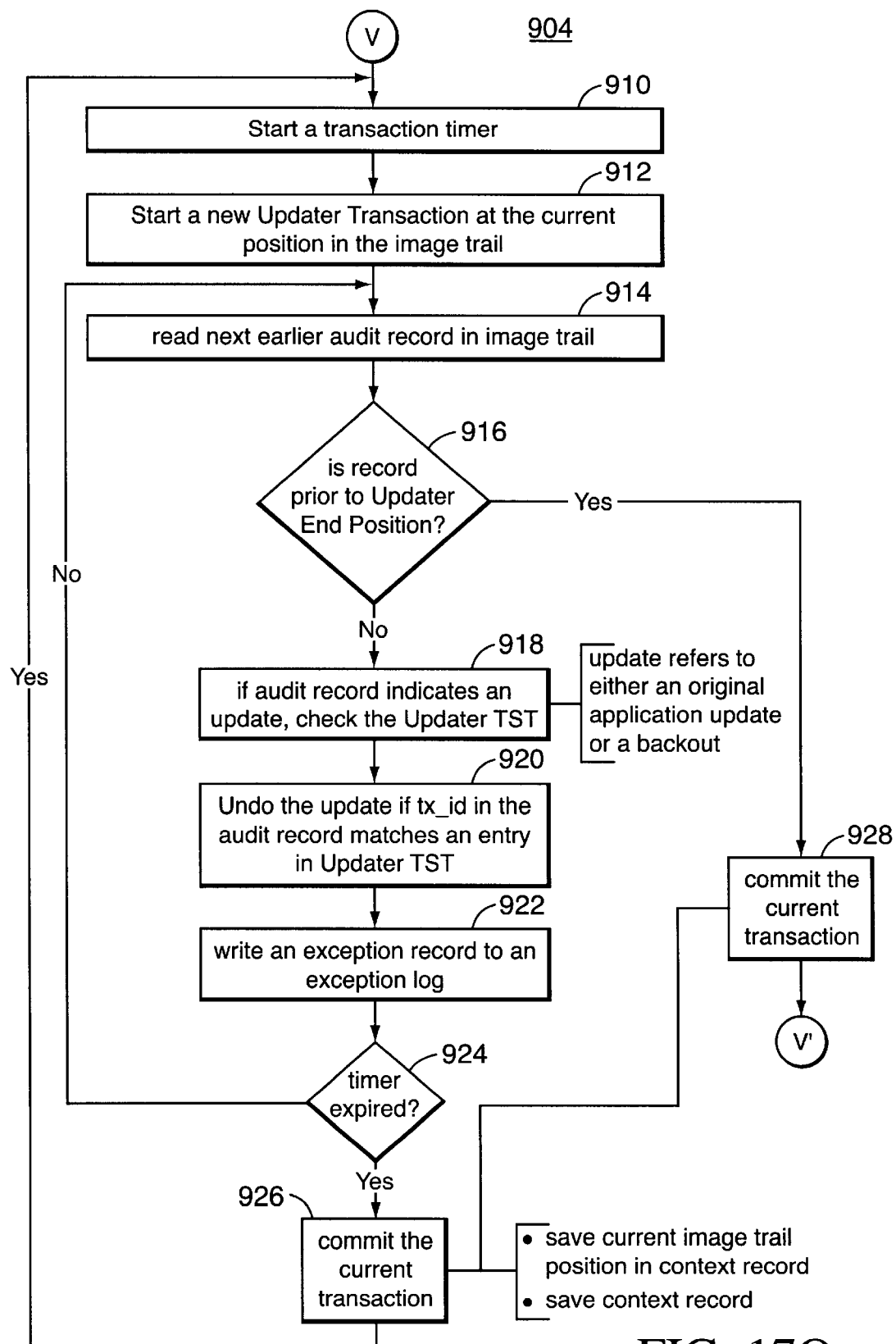

FIG. 17P, detail U, sets forth the procedure for performing the Undo Operations based on the Network Undo List. Once the permission is given to perform a Network Undo Pass when the Network Undo List is ready, as determined in step 900, all entries of the Network Undo List are stored, in step 902, in the Updater TST. This TST is similar to the local TST except that the Final State Column is removed. Then all the updates associated with transactions in the Updater TST are undone, in step 904, as set forth in detail V, FIG. 17Q.

Undo all Updates Associated with Transactions in Updater TST (Detail V)

FIG. 17Q sets forth the procedure for performing the Undos associated with transactions that must be undone. First a transaction time is started, in step 910, and a new Updater Transaction is started, in step 912, at the current position in the image trail of a SIT. Then the next earlier audit record in the image trail is read, in step 914, and if the Updater End Position has not been passed, as determined in step 916 and the audit record indicates an update, the Updater TST is checked, in step 918. If the tx_id of the audit record matches a tx_id in the Updater TST, then the update is undone, in step 920, and an exception record is written, in step 922, to an exception log. Update is used here in a general sense to refer to either an original application update or a backout of an original application update. If the time has not expired, as determined in step 924, this is repeated for each entry in the image trail, until the timer does expire, in step 924, at which point the current transaction is committed in step 926. If the Updater End Position is reached, as determined in step 916 before the timer expires, the current transaction is committed, in step 928. When the current transaction is committed, the current image trail position is saved in the Updater's context record and the context record itself is saved.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of backing up a distributed database system including a plurality of primary nodes, each with a database and transaction monitor, each primary node configured to participate in at least one distributed transaction, and each primary node having a backup node with a database, the method comprising:

performing a local backup operation on the database of each backup node to leave on the backup node's database only those transactions received as committed or aborted from the backup node's primary node; and performing a global backup operation to undo any committed transaction whose presence causes the backup nodes to primary nodes that participated in the distributed transaction to be inconsistent.

2. A method of backing up a distributed database system as recited in claim 1, wherein the step of performing a global backup operation includes:

finding a common synchronization point among the backup nodes;

producing for each backup node a local commit list that contains all transactions received as committed on each backup node from the common synchronization point through the last committed transaction received on the backup node;

modifying the local commit list at each backup node to mark as undo
(i) committed transactions that are not fully committed and (ii) committed transactions that are potentially dependent on transactions not fully committed;
forming a network undo list based on the modified local commit list; and
undoing the updates for those transactions in the network undo list.

3. A method of backing up a distributed database system as recited in claim 2, wherein the step of modifying the local commit list at each backup node includes determining which transactions in the local commit list at each node did not commit on all the primary nodes that participated in the distributed transaction and marking them for undo.

4. A method of backing up a distributed database system as recited in claim 2, wherein the step of modifying the local commit list at each backup node includes determining whether a candidate committed transaction subsequent to a non-fully committed transaction in a local commit list is potentially dependent on transaction not fully committed by:
obtaining from each of the participating nodes of the transaction the order of commits of the transaction not fully committed and the candidate committed transaction; and
detecting whether the order of commits is different at any of the participating nodes; and
if the order of commits is not different on at least one participating node, marking the candidate transaction as undo.

5. A method of backing up a distributed database system as recited in claim 2,
wherein each backup node includes a local undo list that stores a synchronization record having a counter field and a previous transaction id field; and
wherein step of finding a common synchronization point among the backup nodes includes:
examining the local undo list for each backup node to find the smallest value of the counter field; and
recording the previous transaction id field as the common synchronization point among the backup nodes.

6. A method of backing up a distributed database system as recited in claim 2,
wherein one of the primary nodes and its associated backup node is designated as a network master node, the network master node having a master configuration record;
wherein each back up node has a master image trail that contains transaction state records of each transaction at the a backup node and an end of file marker; and
wherein the step of producing for each backup node a local commit list that contains all transactions received as committed on each backup node from the common synchronization point through the last committed transaction received on the backup node includes:
reading the network master configuration record to obtain a common synchronization point transaction id;
locating the record in the master image trail having the common synchronization point transaction id;
going back in the master image trail a predetermined amount of time prior to the common synchronization point to establish a modified synchronization point;
forming, from the master image trail, a local commit list that contains an entry for each committed transaction at each backup node from the modified synchronization point forward to the end of file of the master image trail; and
saving the local commit list.

7. A method of backing up a distributed database system as recited in claim 2, wherein the step of modifying the local commit list at each backup node includes:
(a) forming, from all the local commit lists, a first master commit list that contains an entry for each network transaction that was received by any backup node as committed and for each such entry a list of nodes That participated in the transaction;
(b) forming, from the first master commit list and all the local commit lists, a second master commit list that contains (i) an entry having status 'committed' for each transaction that committed on all of the backup nodes whose associated primary node participated in the transaction and (ii) an entry having status 'unknown' for every transaction that committed on fewer than all of the participating nodes;
(c) forming, for each node, from the second master commit list and the local commit list for the node, a second local commit list for the node, the second local commit list containing (i) an entry having status 'undo' if a corresponding entry in the second master commit list has status 'unknown', (ii) an entry having status 'undo' if the entry is not independent of an entry marked 'undo' in (i), and (iii) an entry having status 'undo', if the entry is a non-network entry;
(d) forming, from the second master commit list and all second local commit lists, a third master commit list that contains an entry having status 'undo' if a corresponding entry in any of the second local commit lists has status 'undo'; and
(e) forming, for each node, from the third master commit list and the second local commit list for the node, a third local commit list for the node, the third local commit list containing an entry having status 'undo' if a corresponding entry in the third master commit list has status 'undo'.

8. A method of backing up a distributed database system as recited in claim 7,
wherein the common synchronization point among the back up nodes includes a transaction id; and
wherein the step of (a) forming a first master commit list includes combining, starting a the common synchronization point transaction id in the local commit list and moving forward, each local commit list into a single list.

9. A method of backing up a distributed database system as recited in claim 7, wherein the step of (b) forming a second master commit list includes comparing the first master commit list against each local commit list to determine which entries pertain to a transaction that committed on fewer than all the nodes that participated in the transaction and marking those entries as 'unknown'.

10. A method of backing up a distributed database system as recited in claim 7, wherein the step of (c) forming a second local commit list includes:
for each node, comparing each entry in the local commit list of the node to the second master commit list to determine whether the entry in the local commit list has status 'unknown' in the second master commit list; and
if an entry in the local commit list is a network entry and has status 'unknown' in the second master commit list;
marking the network entry in the local commit list as first network undo; and
marking any entries subsequent to the first network undo entry, as undo, if the subsequent entry is a non-network entry, if the corresponding entry is marked as unknown in the second master commit list, or if the subsequent entry has a potential dependency on the first network undo entry.

11. A method of backing up a distributed database system as recited in claim 10, wherein the step of marking entries subsequent to the first network undo entry, as undo, if the subsequent entry has a potential dependency on the first network undo entry, includes:

obtaining, from the local commit list, a first list of participating nodes for the first network undo entry;

obtaining, from the second master commit list, a second list of participating nodes for the subsequent entry;

comparing the first list to the second list to determine whether there is at least one other node that participated in both the transaction of the subsequently entry and the transaction of the first network undo entry;

if there is no other participating node, marking the entry as undo;

if there is at least one other participating node, then for every other participating node, comparing the commit sequence of the first list to the commit sequence in the local commit list of every other participating node; and if the commit sequence in the local commit list of every other participating node is the same as the commit sequence of the first network undo entry marking the entry as undo.

12. A method of backing up a distributed database system as recited in claim 7, wherein the step of (d) forming a third master commit list includes:

obtaining status of each entry in each second local commit list, the status being either commit or undo;

for any entry marked as undo in any second local commit list, finding the corresponding entry in the second master commit list and marking the entry as undo to update the entry; and saving the updated second master commit list as the third master commit list.

13. A method of backing up a distributed database system as recited in claim 7, wherein the step of (e) forming a third local commit list includes:

obtaining status of each entry in each second local commit list, the status being either commit or undo;

for any entry marked as commit in the second local commit list, finding any corresponding entry in the third master commit list and marking the entry as undo to update the entry if the corresponding entry in the third master commit list is marked as undo; and saving the updated second local commit list as the third local commit list.

14. A method of backing up a distributed database system as recited in claim 2, wherein the step of forming a network undo list for each backup node based on the modified local commit list includes;

extracting the entries marked as undo in the third local commit list;

forming the network undo list from the extracted entries; and saving the network undo list for each backup node.

15. A method of backing up a distributed database system as recited in claim 2, wherein each backup node has an image trail;

wherein the step of undoing, at each backup node, the updates for those transactions in the backup node's network undo list includes:

for each backup node,
examining the image trail at the backup node for transactions that are in the backup node's network undo list and
undoing transactions in the image trail and in the network undo list.

16. A system, comprising:

a plurality of primary nodes;

a plurality of backup nodes, wherein each backup node is associated with a primary node, and each backup node backs up transactions performed on the associated primary node and retains only those transactions received from the associated primary node as committed or aborted;

wherein the primary and backup nodes coordinate to undo any committed transactions on a backup node whose presence causes data on the backup nodes to be inconsistent.

17. The system of claim 16 wherein at least one of the primary nodes is at least partially responsible for causing:

a common synchronization point among the backup nodes to be generated;

a local commit list to be generated that contains all transactions received as committed on each backup node from the common synchronization point through the last committed transaction received on the backup node;

modifications to the local commit list at each backup node to mark as undo those committed transactions that are not fully committed and those committed transactions that are potentially dependent on transactions not fully committed;

a network undo list to be formed for each backup node based on the modified local commit list; and updates to be undone for those transactions in the backup node's network undo list.

* * * * *